United States Patent
Phuyal et al.

(10) Patent No.: US 12,452,744 B2
(45) Date of Patent: Oct. 21, 2025

(54) LOWER LAYER TRIGGERED MOBILITY CELL GROUPING

(71) Applicant: QUALCOMM Incorporated, San Diego, CA (US)

(72) Inventors: Umesh Phuyal, San Diego, CA (US); Jelena Damnjanovic, Del Mar, CA (US); Le Liu, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 396 days.

(21) Appl. No.: 18/320,545

(22) Filed: May 19, 2023

(65) Prior Publication Data

US 2024/0388978 A1    Nov. 21, 2024

(51) Int. Cl.
  *H04W 36/00* (2009.01)
  *H04W 36/32* (2009.01)
  *H04W 80/02* (2009.01)

(52) U.S. Cl.
  CPC ... *H04W 36/0069* (2018.08); *H04W 36/0058* (2018.08); *H04W 36/0061* (2013.01); *H04W 36/00835* (2018.08); *H04W 36/324* (2023.05); *H04W 80/02* (2013.01)

(58) Field of Classification Search
  CPC ......... H04W 36/0069; H04W 36/0058; H04W 36/0061; H04W 36/00835; H04W 36/324; H04W 80/02; H04W 36/0085
  See application file for complete search history.

(56) References Cited

U.S. PATENT DOCUMENTS

| | | |
|---|---|---|
| 2022/0264346 A1 | 8/2022 | Damnjanovic et al. |
| 2024/0049085 A1* | 2/2024 | Tseng ................ H04W 36/0055 |
| 2024/0056923 A1* | 2/2024 | Murugaiyan ....... H04W 36/362 |
| 2024/0155456 A1* | 5/2024 | Akl ................... H04W 36/0055 |
| 2024/0179602 A1* | 5/2024 | Damnjanovic ..... H04W 36/362 |
| 2024/0340736 A1* | 10/2024 | Awada .............. H04W 56/0045 |
| 2025/0142427 A1* | 5/2025 | Freda .............. H04W 36/00835 |
| 2025/0234257 A1* | 7/2025 | Prasad ............. H04W 36/0061 |

OTHER PUBLICATIONS

International Search Report and Written Opinion—PCT/US2024/023018—ISA/EPO—Jul. 16, 2024.

(Continued)

*Primary Examiner* — Eunsook Choi
(74) *Attorney, Agent, or Firm* — Harrity & Harrity, LLP

(57) ABSTRACT

Various aspects of the present disclosure generally relate to wireless communication. Some aspects relate to Layer 1 or Layer 2 triggered mobility (LTM) using groups of candidate cells. Some aspects more specifically relate to performing LTM operations, such as measurement, reporting, or switching, for cells of an activated group of candidate cells for LTM. In some aspects, a user equipment (UE) may measure an activated group of candidate cells in accordance with the activated group of candidate cells being activated. For example, the UE may not measure candidate cells that do not belong to an activated group of candidate cells. In some aspects, the activated group of candidate cells may include a subset of all candidate cells configured for the UE. For example, the UE may perform measurement and reporting for the subset of candidate cells, instead of all candidate cells configured for the UE.

30 Claims, 9 Drawing Sheets

(56) References Cited

OTHER PUBLICATIONS

Panasonic: "Discussion on L1 Enhancements for L1L2-Triggered Mobility", 3GPP TSG-RAN WG1 #113, R1-2305693, 3rd Generation Partnership Project (3GPP), Mobile Competence Centre, 650, Route Des Lucioles, F-06921 Sophia-Antipolis Cedex, France, vol. RAN WG1, No. Incheon, Korea, May 22, 2023-May 26, 2023, May 15, 2023, 4 Pages, XP052386006, the whole document.

ZTE Corporation, et al., "Discussion On Candidate Cell Configuration and Maintenance", 3GPP TSG-RAN WG2 Meeting #121, R2-2301216, 3rd Generation Partnership Project (3GPP), Mobile Competence Centre, 650, Route Des Lucioles, F-06921 Sophia-Antipolis Cedex, France, vol. 3GPP RAN 2, No. Athens, GR, Feb. 27, 2023-Mar. 3, 2023, 9 Pages, Feb. 17, 2023, pp. 1-8.

Co-pending U.S. Appl. No. 17/865,506, entitled "Reducing Measurement and Reporting Overhead for Aerial Vehicles," by Phuyal et al., filed Jul. 15, 2022.

\* cited by examiner

LOWER LAYER TRIGGERED MOBILITY CELL GROUPING

FIELD OF THE DISCLOSURE

Aspects of the present disclosure generally relate to wireless communication and specifically, to techniques and apparatuses for lower layer triggered mobility cell grouping.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipment (UEs) to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

Layer 1 or Layer 2 triggered mobility (LTM) (which may be referred to as lower-layer triggered mobility or Layer 1 or Layer 2 triggered handover) may involve a user equipment (UE) being configured (such as via Layer 3 semi-static signaling) with a set of candidate cells. The UE may be triggered, using Layer 1 or Layer 2 dynamic signaling or a condition at the UE, to add one of the candidate cells as a serving cell or a non-serving cell. LTM provides cell switching with lower overhead than some mobility operations, such as mobility operations that are handled entirely in the radio resource control layer.

A UE may provide access network connectivity and access to services for an aerial platform. For example, the aerial platform may include an uncrewed aerial vehicle (UAV) or another form of airborne platform.

SUMMARY

Some aspects described herein relate to a method of wireless communication performed by a user equipment (UE). The method may include receiving information indicating one or more groups of candidate cells, wherein each group of candidate cells, of the one or more groups of candidate cells, includes a respective set of candidate cells for Layer 1 or Layer 2 (L1/L2) triggered mobility (LTM). The method may include identifying an activated group of candidate cells of the one or more groups of candidate cells. The method may include measuring the activated group of candidate cells in accordance with the activated group of candidate cells being activated.

Some aspects described herein relate to a method of wireless communication performed by a network node. The method may include outputting, for a UE, information indicating one or more groups of candidate cells, wherein each group of candidate cells, of the one or more groups of candidate cells, includes a respective set of candidate cells for LTM. The method may include identifying an activated group of candidate cells of the one or more groups of candidate cells. The method may include initiating a command for the UE to perform LTM to a cell, of the activated group of candidate cells, in accordance with the cell belonging to the activated group of candidate cells.

Some aspects described herein relate to a non-transitory computer-readable medium that stores a set of instructions for wireless communication by a UE. The set of instructions, when executed by one or more processors of the UE, may cause the UE to receive information indicating one or more groups of candidate cells, wherein each group of candidate cells, of the one or more groups of candidate cells, includes a respective set of candidate cells for LTM. The set of instructions, when executed by one or more processors of the UE, may cause the UE to identify an activated group of candidate cells of the one or more groups of candidate cells. The set of instructions, when executed by one or more processors of the UE, may cause the UE to measure the activated group of candidate cells in accordance with the activated group of candidate cells being activated.

Some aspects described herein relate to a non-transitory computer-readable medium that stores a set of instructions for wireless communication by a network node. The set of instructions, when executed by one or more processors of the network node, may cause the network node to output, for a UE, information indicating one or more groups of candidate cells, wherein each group of candidate cells, of the one or more groups of candidate cells, includes a respective set of candidate cells for LTM. The set of instructions, when executed by one or more processors of the network node, may cause the network node to identify an activated group of candidate cells of the one or more groups of candidate cells. The set of instructions, when executed by one or more processors of the network node, may cause the network node to initiate a command for the UE to perform LTM to a cell, of the activated group of candidate cells, in accordance with the cell belonging to the activated group of candidate cells.

Some aspects described herein relate to a UE for wireless communication. The UE may include one or more memories and one or more processors coupled to the one or more memories. The one or more processors may be configured to receive information indicating one or more groups of candidate cells, wherein each group of candidate cells, of the one or more groups of candidate cells, includes a respective set of candidate cells for LTM. The one or more processors may be configured to identify an activated group of candidate cells of the one or more groups of candidate cells. The one or more processors may be configured to measure the activated group of candidate cells in accordance with the activated group of candidate cells being activated.

Some aspects described herein relate to a network node for wireless communication. The network node may include one or more memories and one or more processors coupled to the one or more memories. The one or more processors may be configured to output, for a UE, information indicating one or more groups of candidate cells, wherein each group of candidate cells, of the one or more groups of candidate cells, includes a respective set of candidate cells for LTM. The one or more processors may be configured to identify an activated group of candidate cells of the one or more groups of candidate cells. The one or more processors may be configured to initiate a command for the UE to perform LTM to a cell, of the activated group of candidate cells, in accordance with the cell belonging to the activated group of candidate cells.

Some aspects described herein relate to an apparatus for wireless communication. The apparatus may include means for receiving information indicating one or more groups of candidate cells, wherein each group of candidate cells, of the one or more groups of candidate cells, includes a respective set of candidate cells for LTM. The apparatus may include means for identifying an activated group of candidate cells of the one or more groups of candidate cells. The apparatus may include means for measuring the activated group of candidate cells in accordance with the activated group of candidate cells being activated.

Some aspects described herein relate to an apparatus for wireless communication. The apparatus may include means for outputting, for a UE, information indicating one or more groups of candidate cells, wherein each group of candidate cells, of the one or more groups of candidate cells, includes a respective set of candidate cells for LTM. The apparatus may include means for identifying an activated group of candidate cells of the one or more groups of candidate cells. The apparatus may include means for initiating a command for the UE to perform LTM to a cell, of the activated group of candidate cells, in accordance with the cell belonging to the activated group of candidate cells.

Aspects generally include a method, apparatus, system, computer program product, non-transitory computer-readable medium, user equipment, base station, network node, network entity, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
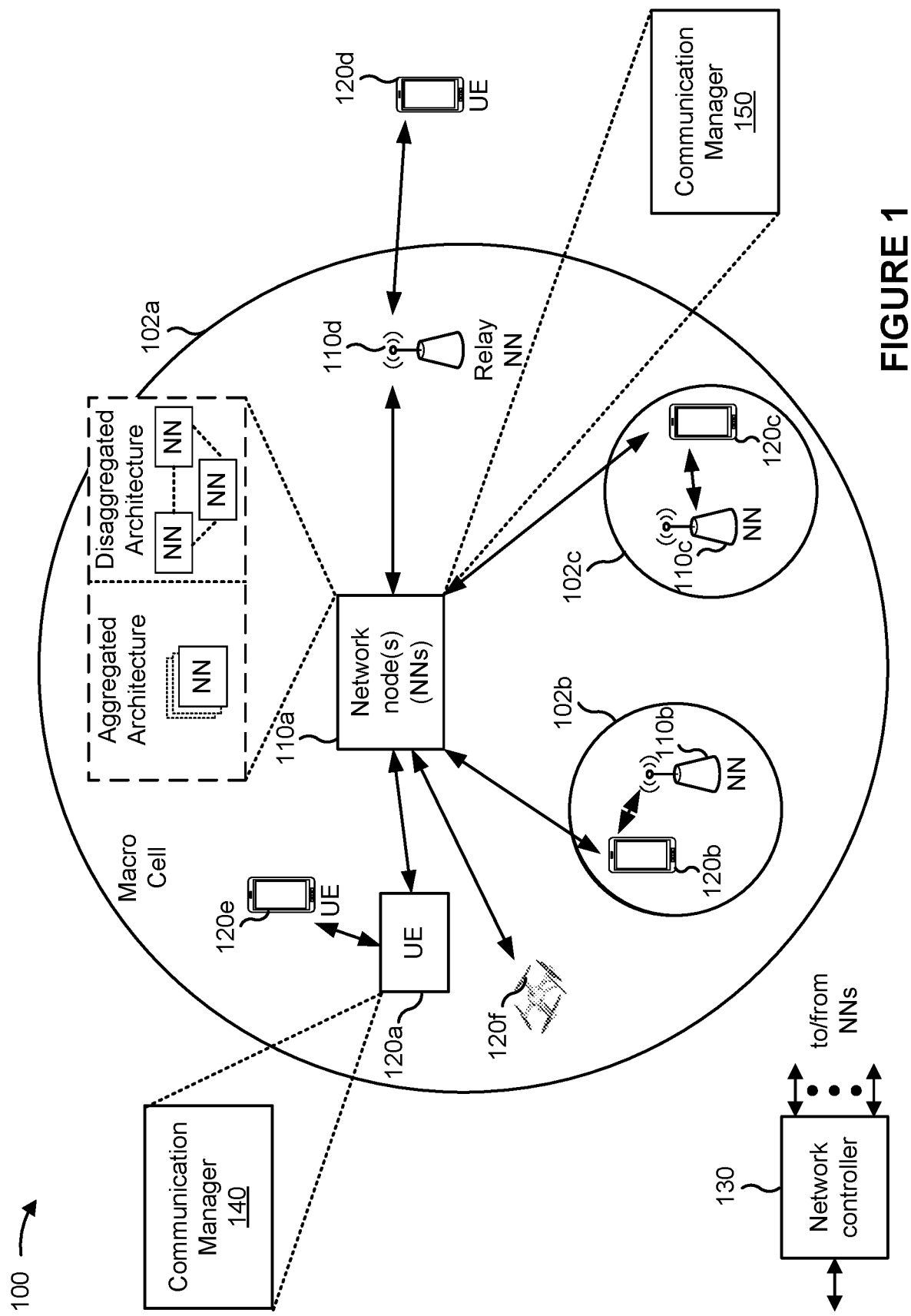
FIG. 1 is a diagram illustrating an example of a wireless network.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

A UE and a network node (such as a gNB) may communicate with one another according to a protocol stack that divides various communication functions into layers. Layer 1 (L1) refers to physical-layer operations such as the transmission of downlink control information, uplink control information, and reference signaling. Layer 2 (L2) typically refers to medium access control (MAC) layer operations, such as managing access to radio resources and coordinating transmission of data between the UE and the network node. Layer 3 (L3) typically refers to radio resource control (RRC) layer operations, which include establishment, maintenance, and release of radio connections (e.g., RRC connections) between the UE and the network node. Generally, operations in a higher layer (such as L3) are associated with greater overhead and latency than operations in a lower layer (such as L1 or L2). Some implementations may use L3 signaling, referred to as semi-static signaling, to configure and execute inter-cell mobility such as handover.

L1 or L2 triggered mobility (LTM) (which may be referred to as lower-layer triggered mobility or L1 or L2 triggered handover) may involve a user equipment (UE) being configured (such as via L3 semi-static signaling) with a set of candidate cells. The UE may be triggered, using L1 or L2 dynamic signaling, to add one of the candidate cells as a serving cell or a non-serving cell. LTM provides cell switching with lower overhead than some mobility operations, such as mobility operations that are handled entirely in the RRC layer. LTM may involve measurement and reporting overhead, since a UE may perform L1 measurements and report the L1 measurements to a network node (such as to facilitate LTM switching or other operations). Furthermore, a UE may maintain a timing advance (TA) and synchronization with candidate cells for LTM, which may also involve some amount of communication with the candidate cells and/or a serving cell of the UE. In some examples, a UE may perform LTM according to a condition, which may be referred to as conditional LTM. For example, if the condition is satisfied, the UE may switch to a candidate cell without having received L1 or L2 signaling to trigger the UE to switch to the candidate cell.

A UE may provide access network connectivity and access to services for an aerial platform. For example, the aerial platform may include an uncrewed aerial vehicle or unmanned aerial vehicle (both abbreviated as "UAV") or another form of airborne platform. UEs associated with aerial platforms (which may be referred to as aerial UEs or sometimes referred to simply as drones) may generally be expected to perform mobility operations (such as handover or reselection) more frequently than terrestrial UEs, for example, due to a higher travel speed of an aerial UE relative to a terrestrial UE, a higher altitude of the aerial UE relative to the terrestrial UE, or a lack of network deployment planning in view of the behavior of aerial UEs. Such aerial UEs may include, for example, UEs associated with an airborne platform such as a crewed or uncrewed aircraft (which may provide communication and network access for such airborne platforms), UEs of passengers in aircraft, or the like.

A network may implement LTM in connection with aerial UEs. For example, an aerial UE may be configured with a set of candidate cells for LTM. However, the mobility characteristics of an aerial UE may lead to frequent de-configuration and reconfiguration of candidate cells, which leads to significant signaling overhead. Furthermore, if a network node configures a sufficiently large number of candidate cells to support mobility for an aerial UE, the measurement and reporting overhead may be prohibitive for the aerial UE. Still further, in the case of conditional LTM, conditions that are suitable for conditional cell switching for a terrestrial UE may not be suitable for an aerial UE, leading to failure to properly utilize conditional LTM or undesired switching of candidate cells.

Various aspects relate generally to LTM using groups of candidate cells. Some aspects more specifically relate to performing LTM operations, such as measurement, reporting, or switching, for cells of an activated group of candidate cells for LTM. In some aspects, a UE may measure an activated group of candidate cells in accordance with the activated group of candidate cells being activated. For example, the UE may not measure (e.g., may not need to measure, may skip measurement of) candidate cells that do not belong to an activated group of candidate cells. In some aspects, the activated group of candidate cells may include a subset of all candidate cells configured for the UE. For example, the UE may perform measurement and reporting for the subset of candidate cells, instead of all candidate cells configured for the UE. In some examples, the UE may perform conditional LTM according to one or more conditions. For example, the one or more conditions may be associated with aerial UEs, and may relate to, for example, an altitude of the UE, flight path information of the UE, or other conditions described herein.

Particular aspects of the subject matter described in this disclosure can be implemented to realize one or more of the following potential advantages. In some examples, by measuring the activated group of candidate cells, measurement and reporting overhead is reduced, and signaling overhead is reduced relative to configuring and measuring a larger number of candidate cells than the activated group of candidate cells. Furthermore, by measuring the activated group of candidate cells in lieu of all configured candidate cells, overhead is reduced relative to de-configuring and re-configuring candidate cells as the UE moves. Still further, by performing conditional LTM according to one or more conditions associated with aerial UEs, efficacy of conditional LTM may be improved and undesired switching of candidate cells may be reduced.

FIG. 1 is a diagram illustrating an example of a wireless network. The wireless network 100 may be or may include elements of a 5G (for example, NR) network or a 4G (for example, Long Term Evolution (LTE)) network, among other examples. The wireless network 100 may include one or more network nodes 110 (shown as a network node (NN) 110a, a network node 110b, a network node 110c, and a network node 110d), a UE 120 or multiple UEs 120 (shown as a UE 120a, a UE 120b, a UE 120c, a UE 120d, UE 120e, and/or a UE 120f), or other network entities. A network node 110 is an entity that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUS)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, or one or more DUs. A network node 110 may include, for example, an NR network node, an LTE network node, a Node B, an eNB (for example, in 4G), a gNB (for example, in 5G), an access point, or a transmission reception point (TRP), a DU, an RU, a CU, a mobility element of a network, a core network node, a network element, a network equipment, and/or a RAN node. In some examples, the network nodes 110 may be interconnected to one another or to one or more other network nodes 110 in the wireless network 100 through various types of fronthaul, midhaul, or backhaul interfaces, such as a direct physical connection, an air interface, or a virtual network, using any suitable transport network.

Each network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used.

A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node.

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), and/or a Non-Real Time (Non-RT) RIC. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

A network controller 130 may couple to or communicate with a set of network nodes 110 and may provide coordination and control for these network nodes 110. The network controller 130 may communicate with the network nodes 110 via a backhaul communication link. The network nodes 110 may communicate with one another directly or indirectly via a wireless or wireline backhaul communication link. In some aspects, the network controller 130 may be a CU or a core network device, or the network controller 130 may include a CU or a core network device.

The wireless network 100 may include one or more relay stations. A relay station is an entity that can receive a transmission of data from an upstream station (for example, a network node 110 or a UE 120) and send a transmission of the data to a downstream station (for example, a UE 120 or a network node 110). A relay station may be a UE 120 that can relay transmissions for other UEs 120. In the example shown in FIG. 1, the network node 110d (for example, a relay network node) may communicate with the network node 110a (for example, a macro network node) and the UE 120d in order to facilitate communication between the network node 110a and the UE 120d. A network node 110 that relays communications may be referred to as a relay station, a relay network node, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses (for example, an augmented reality (AR), virtual reality (VR), mixed reality, or extended reality (XR) headset), a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global navigation satellite system device, a UE function of a network node, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In some examples, two or more UEs 120 (for example, shown as UE 120*a* and UE 120*c*) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol using, for example, a PC5 interface for direct communication, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110. In other examples, the two or more UEs 120 may communicate through a vehicle-to-network-to-vehicle (V2N2V) protocol, for example, by communicating through a Uu interface using the LTE and/or NR uplink and downlink.

In some examples, a UE 120 may be an aerial UE (shown as UE 120*f*). An aerial UE 120*f* may be associated with an aerial platform, such as an uncrewed aerial vehicle (UAV), an uncrewed aircraft system (UAS), a manned aircraft system, or a satellite. A manned aircraft system may include an airplane, helicopter, or a dirigible, among other examples. A UAS platform may include a high-altitude platform station (HAPS), and may include a balloon, a dirigible, or an airplane, among other examples. An aerial UE 120*f* may provide access to the wireless network 100 in association with the aerial platform. For example, the aerial UE 120*f* may facilitate access to data and/or control communication with the wireless network 100.

In some aspects, the UE 120 may include a communication manager 140. As described in more detail elsewhere herein, the communication manager 140 may receive information indicating one or more groups of candidate cells, wherein each group of candidate cells, of the one or more groups of candidate cells, includes a respective set of candidate cells for LTM; identify an activated group of candidate cells of the one or more groups of candidate cells; and measure the activated group of candidate cells in accordance with the activated group of candidate cells being activated. Additionally, or alternatively, the communication manager 140 may perform one or more other operations described herein.

In some aspects, the network node 110 may include a communication manager 150. As described in more detail elsewhere herein, the communication manager 150 may output, for a UE, information indicating one or more groups of candidate cells, wherein each group of candidate cells, of the one or more groups of candidate cells, includes a respective set of candidate cells for LTM; identify an activated group of candidate cells of the one or more groups of candidate cells; and initiate a command for the UE to perform LTM to a cell, of the activated group of candidate cells, in accordance with the cell belonging to the activated group of candidate cells. Additionally, or alternatively, the communication manager 150 may perform one or more other operations described herein.

Figure 2:
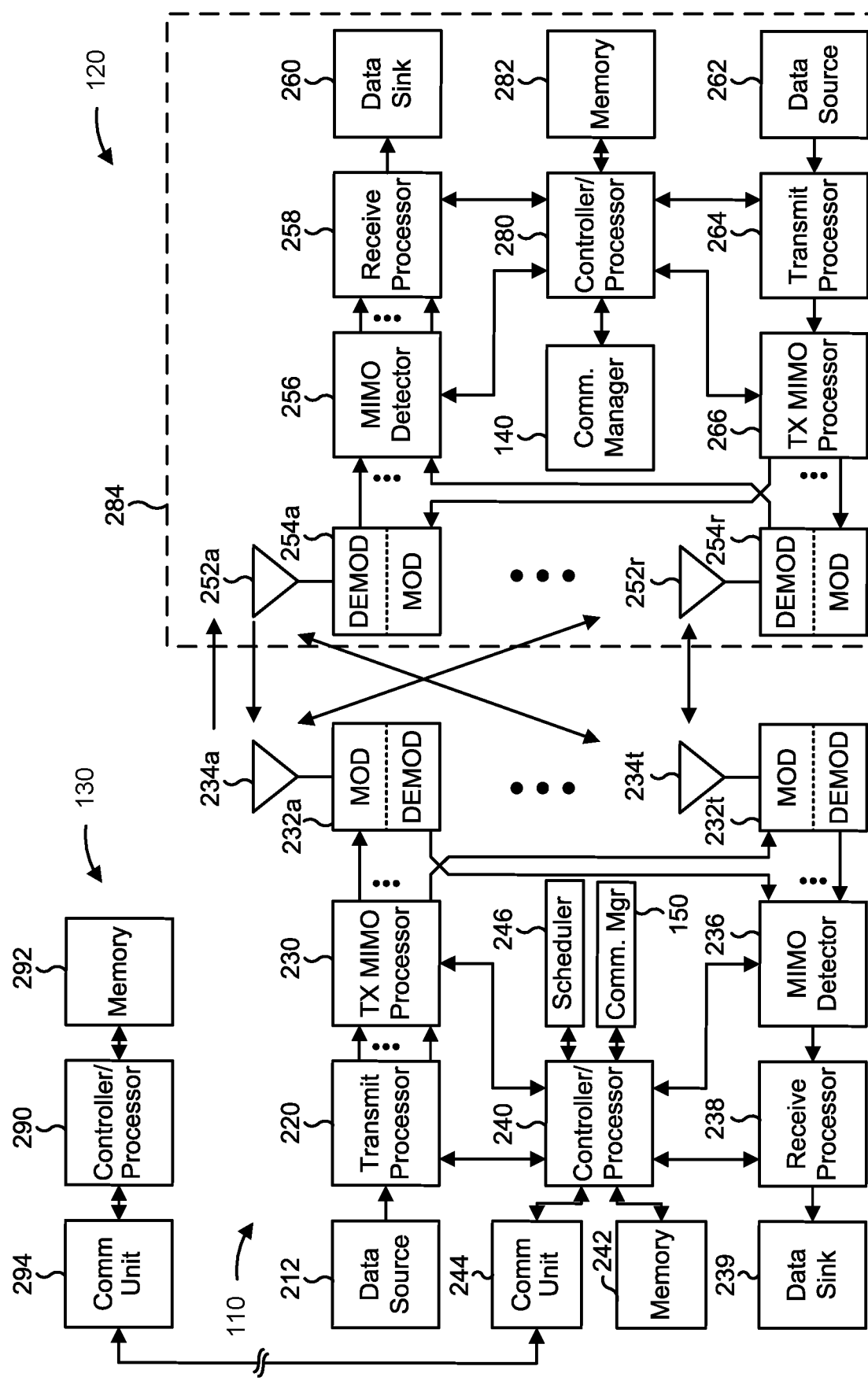
FIG. 2 is a diagram illustrating an example network node in communication with a user equipment (UE) in a wireless network.

FIG. 2 is a diagram illustrating an example network node in communication with a UE in a wireless network. The network node may correspond to the network node 110 of FIG. 1. Similarly, the UE may correspond to the UE 120 of FIG. 1. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of depicted in FIG. 2 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232*a* through 232*t*. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232*a* through 232*t* may transmit a set of downlink signals (for example, T downlink signals) via a corresponding set of antennas 234 (for example, T antennas), shown as antennas 234*a* through 234*t*.

At the UE 120, a set of antennas 252 (shown as antennas 252*a* through 252*r*) may receive the downlink signals from the network node 110 or other network nodes 110 and may provide a set of received signals (for example, R received signals) to a set of modems 254 (for example, R modems), shown as modems 254*a* through 254*r*. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers and/or one or more processors. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP. RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the network node 110, the controller/processor 280 of the UE 120, or any other component(s) of FIG. 2 may perform one or more techniques associated with LTM using groups of candidate cells, as described in more detail elsewhere herein. For example, the controller/processor 240 of the network node 110, the controller/processor 280 of the UE 120, or any other component(s) of FIG. 2 may perform or direct operations of, for example, process 600 of FIG. 6, process 700 of FIG. 7, or other processes as described herein. The memory 242 and the memory 282 may store data and program codes for the network node 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 600 of FIG. 6, process 700 of FIG. 7, or other processes as described herein. In some examples, executing instructions may include running the instructions, converting the instructions, compiling the instructions, or interpreting the instructions, among other examples.

In some aspects, the UE 120 includes means for receiving information indicating one or more groups of candidate cells, wherein each group of candidate cells, of the one or more groups of candidate cells, includes a respective set of candidate cells for LTM; means for identifying an activated group of candidate cells of the one or more groups of candidate cells; and/or means for measuring the activated group of candidate cells in accordance with the activated group of candidate cells being activated. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for outputting, for a UE, information indicating one or more groups of candidate cells, wherein each group of candidate cells, of the one or more groups of candidate cells, includes a respective set of candidate cells for LTM; means for identifying an activated group of candidate cells of the one or more groups of candidate cells; and/or means for initiating a command for the UE to perform LTM to a cell, of the activated group of candidate cells, in accordance with the cell belonging to the activated group of candidate cells. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

Figure 3:
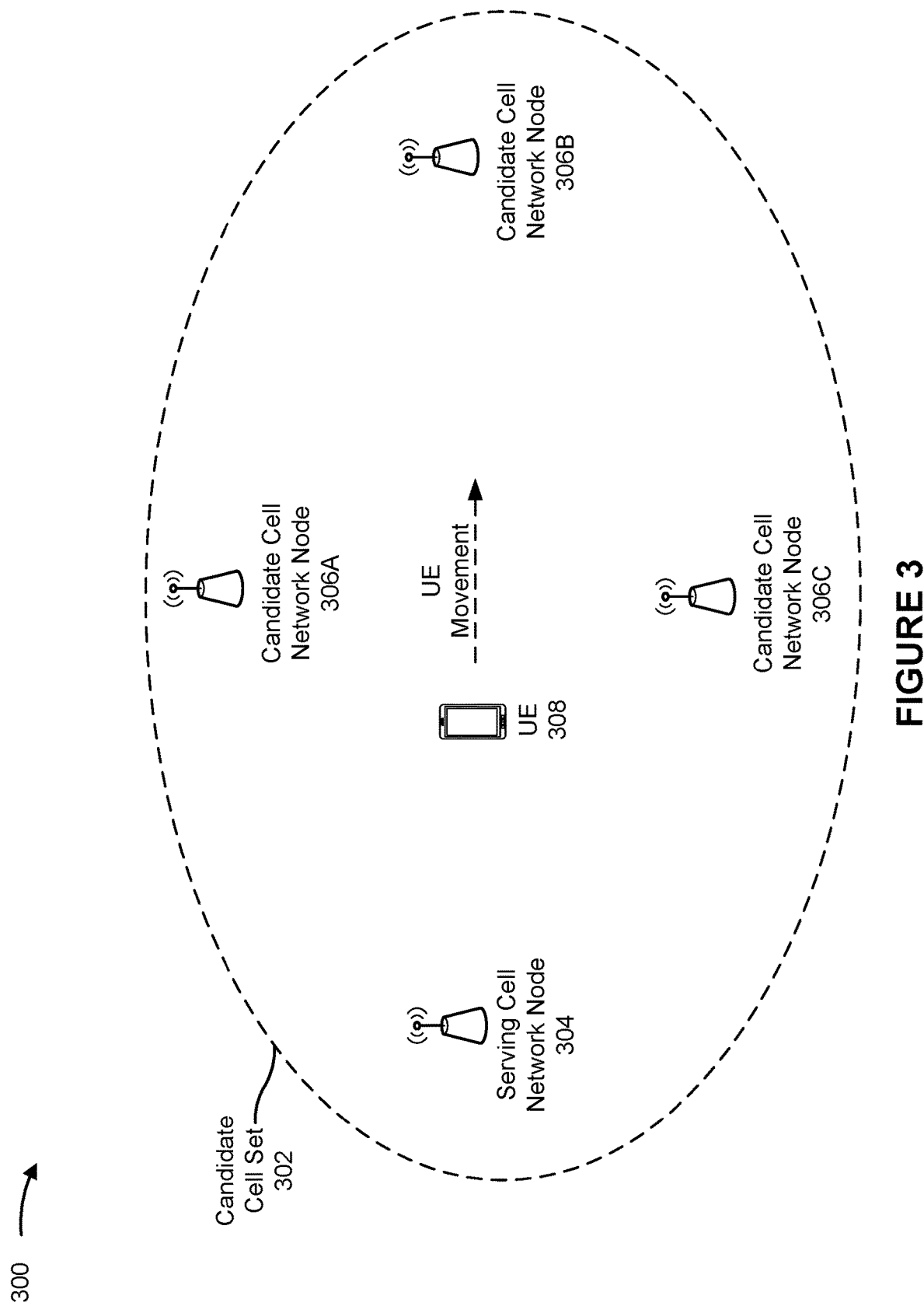
FIG. 3 is a diagram illustrating an example of Layer 1 or Layer 2 (L1/L2) triggered mobility (LTM).

FIG. 3 is a diagram illustrating an example 300 of LTM. As shown in FIG. 3, a network may include a candidate cell set 302 that includes a serving cell 304 (provided by a network node 110) and a set of candidate cells 306A, 306B, and 306C (for example, provided by one or more network nodes 110). In some aspects, all cells of the candidate cell set 302 may be provided by the same network node 110. In some aspects, a first subset of the candidate cell set 302 may be provided by a first network node 110 and a second subset of the candidate cell set 302 may be provided by a second network node 110.

Generally, LTM involves the handover of a UE 308 (that is, the change of a serving cell of the UE 308) via L1/L2 signaling. LTM may enable the UE 308 (which may correspond to UE 120 of FIG. 1) to maintain an upper-layer configuration and/or minimize changes of configuration of lower layers of the UE, which reduces latency and disruption relative to forms of handover that utilize RRC (that is, Layer 3) signaling. LTM can include intra-DU mobility or intra-CU-inter-DU mobility.

A UE 308 is located within coverage of the candidate cell set 302 and is in communication with the serving cell (for example, network node) 304. While in communication with the serving cell (for example, network node) 304, UE movement away from the serving cell (for example, network node) 304 may cause the UE 308 to have reduced signal strength and/or capacity via the serving cell and may cause the UE 308 to have increased signal strength and/or capacity via a candidate cell, such as a candidate cell associated with the candidate cell (for example, network node) 306B.

In some networks, a special cell (SpCell) for the UE 308 may be updated via L1/L2 signaling based at least in part on L1 measurement of the serving cell 304 and the candidate cell(s) 306. In some networks, UE mobility (for example, moving from one cell to another cell) may include intra-frequency mobility or inter-frequency mobility. An SpCell is a primary cell (for example, a cell on which initial access is initiated and/or that is served by a main network node such as a master gNB) or a primary secondary cell (for example, a primary cell that is served by a secondary network node and configured by signaling over the primary cell). The term "serving cell" can refer to any primary cell or any secondary cell of the UE 308. A non-serving cell is a cell that is not a serving cell (for example, candidate cell 306).

Techniques described herein provide the configuration of one or more groups of candidate cells. A group of candidate cells may include a candidate cell set 302 or a subset of a candidate cell set 302. A group of candidate cells may be activated or deactivated. An activated group of candidate cells may be available as target candidate cells for LTM. For example, only cells 304 and/or 306 belonging to an activated group of candidate cells may be indicated as an SpCell via L1/L2 signaling. As another example, the UE 308 may measure only cells 304 and/or cells 306 belonging to the activated group of candidate cells.

Figure 4:
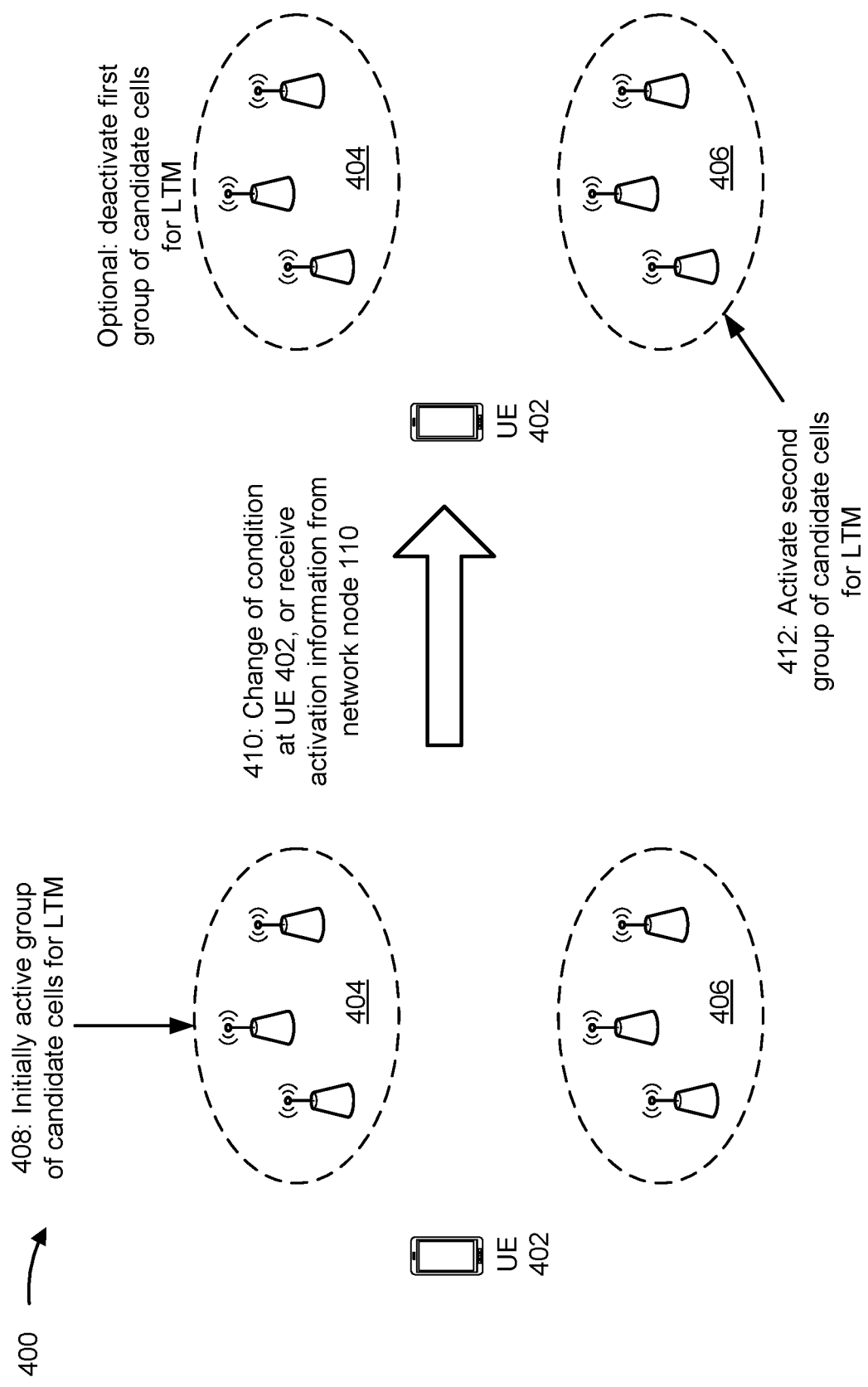
FIG. 4 is a diagram illustrating an example of groups of candidate cells for LTM.

FIG. 4 is a diagram illustrating an example 400 of groups of candidate cells for LTM. Example 400 includes a UE 402 (for example, UE 120, UE 308). Cells of FIG. 4 may be implemented by one or more network nodes 110, such as a single DU or multiple DUs.

Example 400 includes a first group of candidate cells 404 and a second group of candidate cells 406. The first group of candidate cells 404 and the second group of candidate cells 406 may each include one or more candidate cells 306, described with regard to FIG. 3. In some aspects, a group of candidate cells 404 and/or 406 may be referred to as an LTM cell group. As shown by reference number 408, initially, the first group of candidate cells 404 is active (for example, activated) and the second group of candidate cells 406 is inactive (for example, not activated). Thus, candidate cells of the first group of candidate cells 404 may be available as target candidate cells, and candidate cells of the second group of candidate cells 406 may not be available as target candidate cells.

As shown by reference number 410, a condition at the UE 402 may change, or the UE 402 may receive activation information from a network node 110. For example, the UE 402 may move from a first altitude (for example, height) to a second altitude. As another example, the UE 402 may move from a first location to a second location (with or without a change in altitude). As another example, the UE 402 may move from a first range of altitudes to a second range of altitudes. As another example, flight path information of the UE 402 may change (for example, the UE 402 may switch from a first flight path to a second flight path, or the UE 402 may proceed from a first part of a flight path to a second part of the flight path). Flight path information may include information identifying a flight path of the UE 402, such as series of locations, a height profile, an orientation profile, a speed profile, or a combination thereof. As another example, the UE 402 may cross an area boundary. An area boundary may indicate a geographical boundary that indicates which group of candidate cells should be active in accordance with a ground position of the UE 402 (for example, a position of the UE 402 as projected to the ground plane). As another example, the UE 402 may cross a three-dimensional geographical boundary. For example, a three-dimensional geographical boundary May indicate a boundary, with reference to at least a vertical axis and two ground-plane axes, that indicates which group of candidate cells should be active.

As shown by reference number 412, in accordance with the condition changing (or according to the activation information), the UE 402 may activate the second group of candidate cells 406. In some aspects, the UE 402 may deactivate the first group of candidate cells 404. In some aspects, multiple groups of candidate cells can be active simultaneously. In some other aspects, only one group of candidate cells can be active at a given time. In some aspects, the UE 402 may switch to a candidate cell of the second group of candidate cells 406 in accordance with the candidate cell belonging to an active group of candidate cells. Additionally, or alternatively, the UE 402 may perform and/or report measurements (for example, L1 measurements) on cells belonging to the second group of candidate cells 406. Additionally, or alternatively, the UE 402 may obtain or maintain a timing advance or synchronization for cells belonging to the activated group of candidate cells.

Thus, the UE 402 can switch from the first group of candidate cells 404 to the second group of candidate cells 406 without de-configuring the second group of candidate cells 406 or separate RRC signaling (for example, upon the condition indicated by reference number 410 being satisfied) to add the second group of candidate cells 406 as candidate cells. Thus, measurement and reporting overhead for the inactive group(s) of candidate cells is reduced. Furthermore, conditional LTM (that is, LTM according to the condition shown by reference number 410) is enabled in accordance with conditions relating to aerial UEs.

Figure 5:
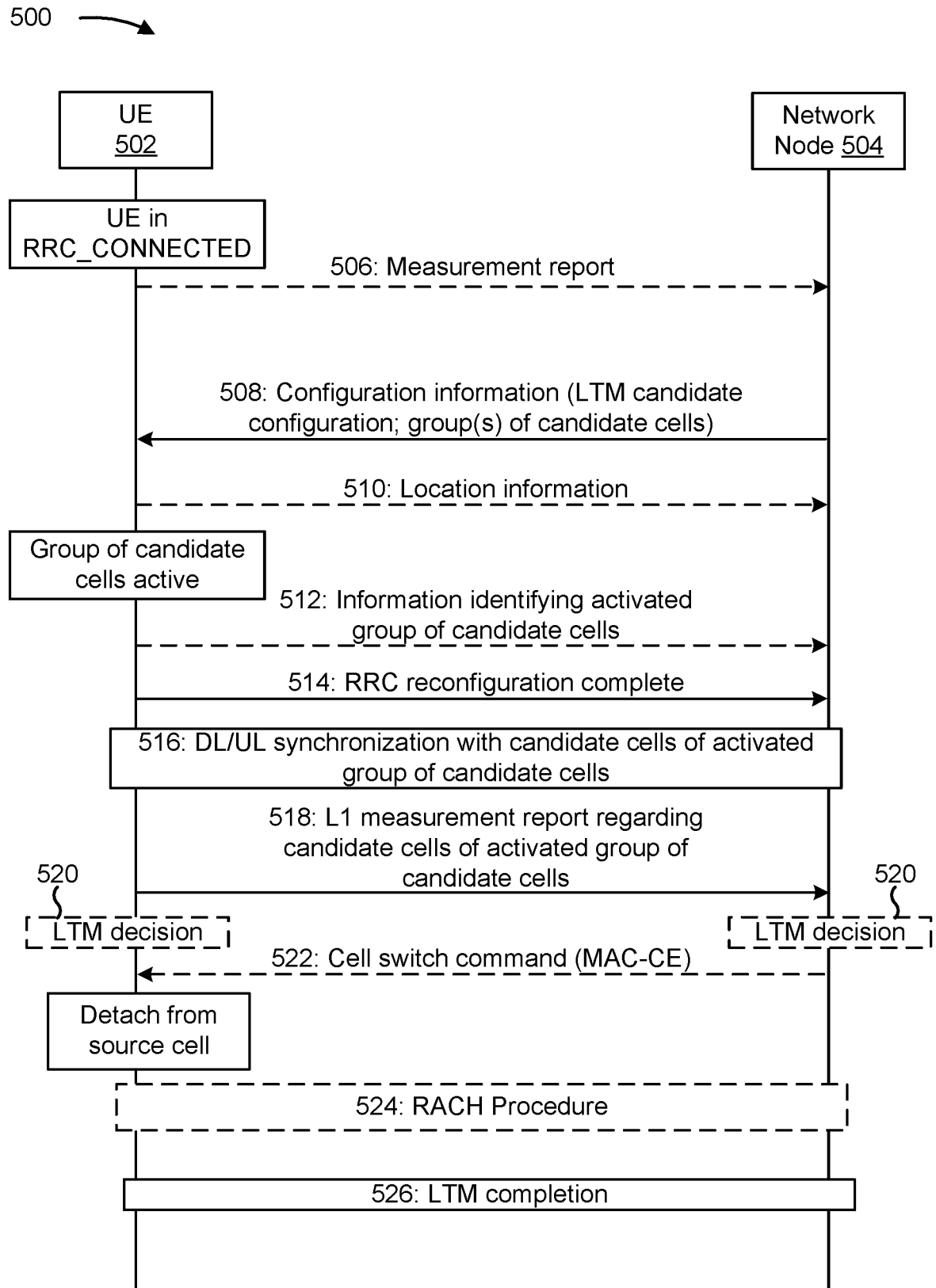
FIG. 5 is a diagram illustrating an example of signaling associated with LTM using a group of candidate cells.

FIG. 5 is a diagram illustrating an example 500 of signaling associated with LTM using a group of candidate cells. Example 500 includes a UE 502 (for example, UE 120, UE 308, UE 402) and a network node 504 (for example, network node 110). In some aspects, network node 504 may implement one or more cells, such as a serving cell of the UE 502 and/or a set of candidate cells of the UE 502. In an LTM, a UE 502 may be in an RRC connected state.

As shown in FIG. 5 by reference number 506, in some examples, the UE 502 may transmit, to the network node 504, a measurement report. The UE 502 may transmit the measurement report via RRC signaling. The network node 504 may determine, based at least in part on the measurement report, to use LTM and may initiate a candidate LTM cell preparation.

As shown, the network node 504 may transmit, to the UE 502, configuration information 508 (which may include an RRC reconfiguration message). The configuration information 508 may indicate a candidate LTM cell configuration, which may indicate a configuration of one or multiple candidate cells (for example, candidate cell 306). Furthermore, the configuration information 508 may indicate one or more groups of candidate cells. The UE 502 may store the candidate LTM cell configuration. As shown, a group of candidate cells, of the one or more groups of candidate cells, may be active at the UE 502 (referred to as an active or activated group of candidate cells). For example, only candidate cells belonging to the activated group of candidate cells may be considered as candidate cells for LTM.

While the activated group of candidate cells is shown as being activated during LTM preparation, in some aspects, a group of candidate cells may be activated at a different point in LTM operation, such as during early synchronization or LTM execution. Additionally, or alternatively, the activated group of candidate cells may change, for example, according to conditions described with regard to FIG. 4. Additionally, or alternatively, an additional group of candidate cells may be activated for the UE 502.

As mentioned, the configuration information 508 may indicate one or more groups of candidate cells. For example, the network node 504 may configure multiple groups of candidate cells using RRC signaling (such as configuration information 508). In some aspects, each group of candidate cells may be associated with a configuration identifier. For example, the configuration information 508 may indicate a set of one or more candidate cells, and may indicate a configuration identifier assigned to the set of one or more candidate cells, such that the set of one or more candidate cells is configured as a group of candidate cells (for example, the first group of candidate cells 404 or the second group of candidate cells 406).

In some aspects, multiple groups of candidate cells may be active. For example, the UE 502 may activate multiple groups of candidate cells (corresponding to multiple configuration identifiers) in accordance with a condition being satisfied. As another example, the UE 502 may activate multiple groups of candidate cells in accordance with activation information (such as Layer 1 signaling including downlink control information (DCI) or Layer 2 signaling including a medium access control (MAC) control element (MAC-CE) from the network node 504) indicating multiple configuration identifiers corresponding to the multiple groups of candidate cells. By defining and activating multiple configuration identifiers corresponding to multiple groups of candidate cells, flexibility regarding which candidate cells are activated is increased. As example, if three groups of candidate cells are defined, including grpA={c1, c2, c3}, grpB={c2, c3, c4}, and grpC={c3, c5, c6}, the UE 502 or the network node 504 may activate grpB and grpC only, which means {c2, c3, c4, c5, c6} can be activated without activating c1. Similarly, if grpA and grpB are activated, {c1, c2, c3, c4} are activated. This avoids creating more groups (such as a grpD={c1, c2, c3, c4} and a grpE={c2, c3, c4, c5, c6}).

In some aspects, the configuration information 508 may indicate one or more conditions. For example, the configuration information 508 may indicate a condition and one or more corresponding groups of candidate cells (such as one or more configuration identifiers corresponding to the one or more groups of candidate cells). If the condition is satisfied, then the UE 502 may activate the one or more groups of candidate cells. In some aspects, if the condition ceases being satisfied, the UE 502 may deactivate the one or more groups of candidate cells.

In some aspects, the network node 504 may transmit, and the UE 502 may receive, activation information, as described with regard to FIG. 4. The activation information may indicate one or more groups of candidate cells that are to be activated. For example, the activation information may indicate one or more configuration identifiers assigned to the one or more groups of candidate cells. As mentioned, the activation information may include Layer 1 signaling, Layer 2 signaling, or a combination thereof. Thus, the network node 504 may perform dynamic grouping of groups of candidate cells. In some aspects, the activation information may include an identifier that is associated with a group of groups of candidate cells. For example, multiple configuration identifiers (corresponding to multiple groups of candidate cells) may be mapped to an identifier, and the activation information may include the identifier. In some aspects, the UE 502 may transmit, and the network node 504 may receive, a request for one or more groups of candidate cells to be activated. For example, the UE 502 may assist the network node 504 by providing or requesting one or more configuration identifiers to be eligible for LTM switching (that is, to be activated).

In some aspects, the activated group of candidate cells may be associated with spectrum or band(s) dedicated for aerial UEs. For example, certain spectrum (such as one or more bands, one or more frequency ranges, one or more bandwidths, or the like) may be dedicated for aerial UEs (for example, dedicated for UAV use), such as by a regulatory authority or a network operator. The activated group of candidate cells may be associated with the spectrum dedicated for aerial UEs in that the activated group of candidate cells includes candidate cells with operating band and bandwidths included in the spectrum dedicated for aerial UEs. For example, upon identifying spectrum dedicated for aerial UEs (such as according to system information, configuration information 508, or the like), the UE 502 may activate one or more groups of candidate cells configured as corresponding to the spectrum dedicated for aerial UEs.

In some aspects, the UE 502 may transmit, and the network node 504 may receive, location information 510. For example, the UE 502 may report a location of the UE 502 (such as a global navigation satellite system (GNSS) based position, a latitude, a longitude, an altitude, flight path information, or the like). In some aspects, the network node 504 may identify an activated group of candidate cells according to the location information 510. For example, the UE 502 may activate the group of candidate cells according to a condition, such as an altitude condition, an altitude change condition, a location condition, a flight path condition, or another condition described with regard to FIG. 4. The network node 504 may be aware of the condition, and may identify the activated group of candidate cells by reference to the location information 510. For example, if the location information 510 indicates that the condition is satisfied, the network node 504 may determine that the group of candidate cells is activated. In some aspects, the location information 510 may include, for example, a predicted altitude associated with a time window (for example, a predicted altitude during the time window or a predicted altitude profile during the time window), a predicted location associated with a time window (for example, a predicted location during the time window or a predicted location profile during a time window), or a combination thereof. As described herein, a profile, such as an altitude profile or a location profile, may indicate a value (for example, altitude or location) as a function of time. While the location information 510 is shown as transmitted prior to L1 measurement reporting, the location information 510 can be transmitted at any time in example 500.

In some aspects, as shown by reference number 512, the UE 502 may transmit, and the network node 504 may receive, information identifying an activated group of candidate cells. For example, the UE 502 may report a configuration identifier corresponding to an activated group of candidate cells. As another example, the UE 502 may report multiple configuration identifiers corresponding to multiple activated groups of candidate cells. In some aspects, the information identifying the activated group of candidate cells may comprise measurement information relating to one or more cells of the activated group of candidate cells. For example, the UE 502 may transmit an L1 measurement report regarding the one or more cells, as described with regard to reference number 514 below. Since the UE 502 may only perform L1 measurement on cells belonging to activated group(s) of candidate cells, the network node 504 may identify the activated group of candidate cells according to the one or more cells indicated by the L1 measurement report.

As shown by reference number 514, the UE 502 may transmit, to the network node 110, an RRC reconfiguration complete message. The measurement report, the RRC reconfiguration message and the RRC reconfiguration complete message may be part of an LTM preparation phase.

As shown by reference 516, the UE may perform a downlink/uplink synchronization and a timing advance (TA) acquisition with candidate cells belonging to the active group of candidate cells, which may occur before receiving an LTM cell switch command. The downlink/uplink synchronization and the TA acquisition may be associated with an early synchronization phase. The UE 502 may acquire the TA of a candidate cell by performing a random access channel (RACH) procedure. In some aspects, the UE 502 may perform uplink synchronization, TA acquisition, and/or TA maintenance for cells belonging to an activated group of candidate cells. For example, the UE 502 may perform uplink synchronization, TA acquisition, and/or TA maintenance only for cells belonging to activated groups of candidate cells. In some aspects, the UE 502 may determine an uplink timing of a candidate cell according to a downlink timing difference between a current serving cell of the UE 502 and the candidate cell.

In some aspects, the network node 504 (for example, a serving cell of the UE 502) may trigger the UE 502 to acquire the TA, such as by transmitting a physical downlink control channel (PDCCH) order triggering the RACH procedure. For example, the network node 504 may trigger the UE 502 to acquire the TA for one or more candidate cells belonging to an activated group of candidate cells. In some aspects, the network node 504 may trigger the UE 502 to acquire the TA for a group of candidate cells upon the group of candidate cells being activated. A DCI (such as a DCI having format 1_0) carried by the PDCCH order may indicate the candidate cell. The RACH procedure may use contention-free random access. A preamble index and RACH occasion (as well as a synchronization signal block (SSB) association) for the candidate cell may be configured per candidate cell. The UE 502 may receive the TA for the candidate cell via a random access response or a medium access control (MAC) message (for example, a MAC-CE). The UE 502 may receive the TA from the candidate cell or from the serving cell.

In some aspects, the RACH procedure may include a transmission on a RACH resource. For example, the RACH resource (which may include a preamble index, a RACH occasion, or a combination thereof) may be specific to a type of the UE 502 (for example, an aerial UE), or a characteristic of the UE 502 (for example, a characteristic indicating that the UE 502 is associated with a UAV). In some aspects, the UE 502 may be configured with RACH resources, for a candidate cell, that indicate that the UE 502 has activated a group of candidate cells to which the candidate cell belongs. Such RACH resources may additionally or alternatively be specific to indicating an activated candidate cell or an activated group of candidate cells. Thus, the UE 502 may be configured with separate RACH resources to access a cell that implicitly notify the network node 504 that a group of candidate cells has been activated, and that allow the UE 502 to obtain a TA pertaining to the group of candidate cells. For example, when the UE 502 is airborne (for example, associated with a UAV flying in the air), a candidate cell may be far away from the UE 502, so RACH resources specific to the type of the UE 502 may provide for obtaining a larger TA than RACH resources for UEs on the ground. As another example, the UE 502 may be configured with RACH resources based at least in part on a condition at the UE, such as a condition relating to an altitude of the UE 502, a range of altitudes of the UE 502, flight path information of the UE 502, a location of the UE 502, an area boundary, a three-dimensional geographical boundary, or the like. Thus, RACH resources may be separately configured for UAV-specific conditions.

The UE 502 may perform L1 measurements on one or more candidate cells belonging to the activated group of candidate cells. For example, the UE may perform L1 measurements and/or reporting (as described with regard to reference number 518) according to a measurement configuration corresponding to an active group of candidate cells. The measurement configuration may indicate resources for measurement, resources for reporting, measurements to perform, cells (for example, of the active group of candidate cells) to measure and/or report measurements for, or the like. In some aspects, the UE 502 may perform and/or report measurements on a subset of the activated group of candidate cells. For example, the network node 504 (for example, a serving cell of the UE 502) may indicate (for example, via dynamic signaling such as Layer 1 or Layer 2 signaling), one or more selected cells, of the activated group of candidate cells, for which to perform measurement and/or reporting.

As shown by reference number 518, the UE may transmit, to the network node, an L1 measurement report, which may indicate the L1 measurements on the one or more candidate cells belonging to the active group of candidate cells. For example, the UE 502 may transmit the L1 measurement report in accordance with a configuration, such as a measurement configuration, corresponding to an active group of candidate cells, as described above.

In some aspects, as shown by reference number 520, the network node 504 may determine to execute an LTM cell switch to a target cell, which may be associated with the L1 measurement report. For example, the network node 504 may select the target cell from the activated group of candidate cells. For example, only cells belonging to a currently activated group(s) of candidate cells may be available as target candidate cells for the LTM. The network node 504 may select the target cell, for example, based at least in part on a measurement associated with the target cell. For example, the network node 504 may select the target cell according to one or more criteria relating to the measurement, such as one or more criteria for adding a serving cell of the UE 502 or switching from one serving cell to another serving cell.

As shown by reference number 522, in some examples, the network node may transmit, to the UE 502, a command (such as a MAC-CE) triggering the LTM cell switch, where the MAC-CE may indicate a candidate configuration index of the target cell. For example, the network node 504 may initiate the LTM cell switch. The UE may detach from a source cell. The UE 502 may apply the candidate configuration index of the target cell. In other words, the UE 502 may switch to a configuration of a candidate LTM target cell. The UE 502 may detach from the source cell and attach to the target cell as part of an LTM execution phase.

In some aspects, the UE 502 may perform an LTM cell switch autonomously. For example, the UE 502 may perform the LTM cell switch without receiving the command triggering the LTM cell switch (such as according to one or more conditions described herein). As another example, the UE 502 may perform the LTM decision indicated by reference number 520. For example, the UE 502 may autonomously (e.g., without receiving a trigger for an LTM cell switch) determine to execute an LTM cell switch to a target cell. In some aspects, the UE 502 may autonomously perform LTM cell switches only to cells belonging to the activated group of candidate cells (e.g., only to cells associated with an active configuration identifier). In some aspects, the UE 502 may report location information, as described with regard to reference number 510. In some aspects, the network node 504 may identify a cell to which the UE 502 has switched, or an activated group of candidate cells, according to the location information. Additionally, or alternatively, the UE 502 may transmit information identifying an activated group of candidate cells (e.g., with measurement results, in some aspects).

As shown by reference number 524, the UE 502 may perform a RACH procedure with the target cell (for example, when a TA is not available). As shown by reference number 526, the UE 502 may transmit, to the target cell, an indication of a successful completion of the LTM cell switch to the target cell. The indication of the successful completion of the LTM cell switch may be part of an LTM completion phase.

Figure 6:
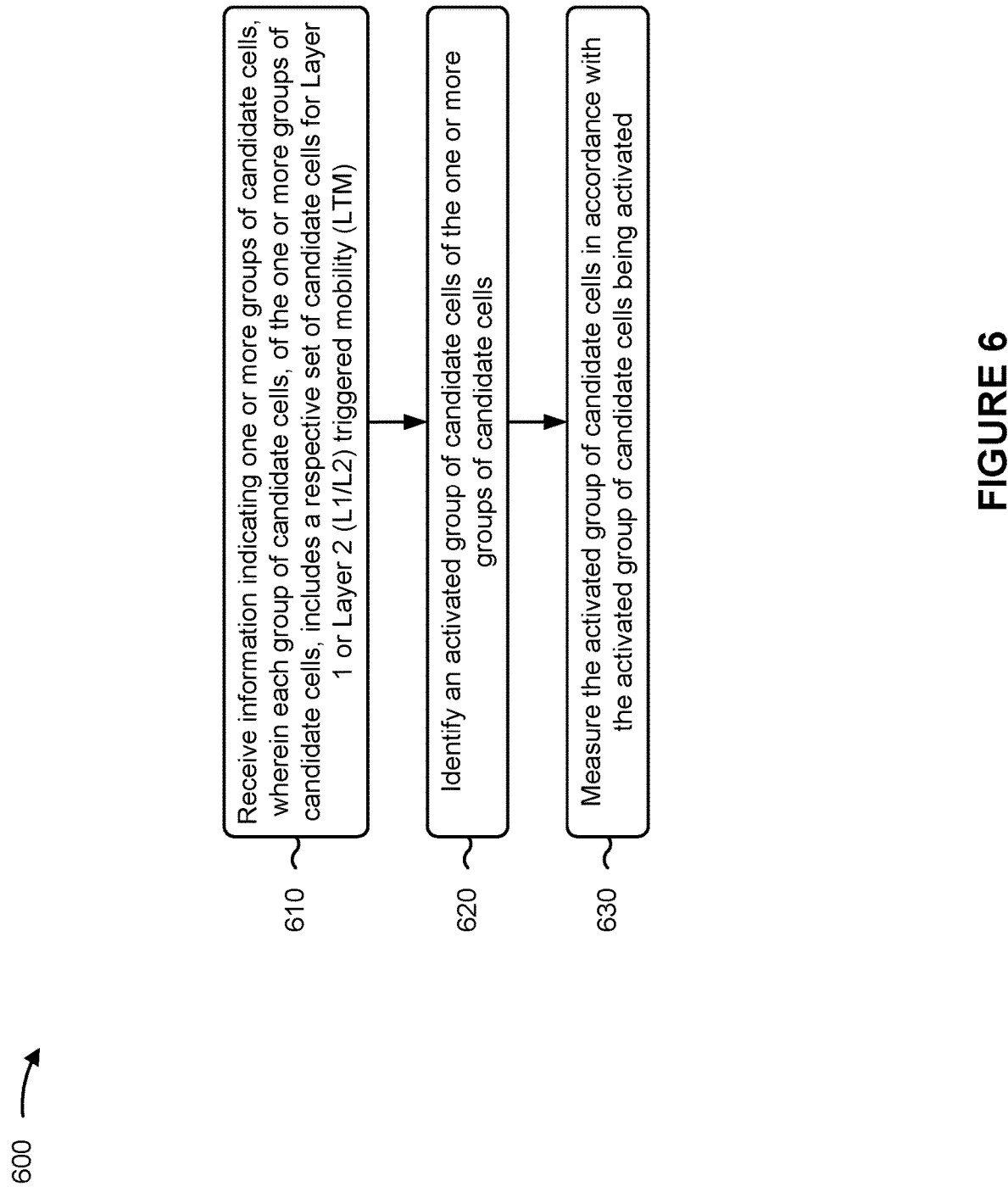
FIG. 6 is a flowchart illustrating an example process performed, for example, by a UE that supports LTM using activated groups of candidate cells.

FIG. 6 is a flowchart illustrating an example process 600 performed, for example, by a UE that supports LTM using activated groups of candidate cells. Example process 600 is an example where the UE (for example, UE 120) performs operations associated with LTM using activated groups of candidate cells.

As shown in FIG. 6, in some aspects, process 600 may include receiving information indicating one or more groups of candidate cells, wherein each group of candidate cells, of the one or more groups of candidate cells, includes a respective set of candidate cells for LTM (block 610). For example, the UE (such as by using communication manager 140 or reception component 802, depicted in FIG. 8) may receive information indicating one or more groups of candidate cells, wherein each group of candidate cells, of the one or more groups of candidate cells, includes a respective set of candidate cells for LTM, as described above.

As further shown in FIG. 6, in some aspects, process 600 may include identifying an activated group of candidate cells of the one or more groups of candidate cells (block 620). For example, the UE (such as by using communication manager 140 or identification component 808, depicted in FIG. 8) may identify an activated group of candidate cells of the one or more groups of candidate cells, as described above.

As further shown in FIG. 6, in some aspects, process 600 may include measuring the activated group of candidate cells in accordance with the activated group of candidate cells being activated (block 630). For example, the UE (such as by using communication manager 140 or measurement component 810, depicted in FIG. 8) may measure the activated group of candidate cells in accordance with the activated group of candidate cells being activated, as described above.

Process 600 may include additional aspects, such as any single aspect or any combination of aspects described below or in connection with one or more other processes described elsewhere herein.

In a first additional aspect, only cells belonging to a currently activated group of candidate cells of the UE are available as target candidate cells for LTM.

In a second additional aspect, alone or in combination with the first aspect, process 600 includes switching to a cell, of the activated group of candidate cells, in accordance with the cell belonging to the activated group of candidate cells.

In a third additional aspect, alone or in combination with one or more of the first and second aspects, the information indicates, for the activated group of candidate cells, a first set of candidate cells of the activated group of candidate cells, a first identifier of the first set of candidate cells, a second set of candidate cells of the activated group of candidate cells, and a second identifier of the second set of candidate cells.

In a fourth additional aspect, alone or in combination with one or more of the first through third aspects, identifying the activated group of candidate cells further comprises identifying the activated group of candidate cells based at least in part on at least one of receiving activation information indicating that the activated group of candidate cells is activated, or identifying the activated group of candidate cells in accordance with a condition at the UE.

In a fifth additional aspect, alone or in combination with one or more of the first through fourth aspects, the activated group of candidate cells is one of a plurality of activated groups of candidate cells, wherein the activation information indicating that the activated group of candidate cells is activated indicates that the plurality of activated groups of candidate cells are activated.

In a sixth additional aspect, alone or in combination with one or more of the first through fifth aspects, the activation information indicates an identifier associated with a group of groups of candidate cells including the plurality of activated groups of candidate cells.

In a seventh additional aspect, alone or in combination with one or more of the first through sixth aspects, the condition relates to at least one of an altitude of the UE, a range of altitudes of the UE, flighting path information of the UE, an area boundary, or a three-dimensional geographical boundary.

In an eighth additional aspect, alone or in combination with one or more of the first through seventh aspects, process 600 includes receiving an indication to switch to the cell of the activated group of candidate cells, wherein switching to the cell of the activated group of candidate cells is in accordance with the indication.

In a ninth additional aspect, alone or in combination with one or more of the first through eighth aspects, the activated group of candidate cells is associated with spectrum dedicated for aerial UEs.

In a tenth additional aspect, alone or in combination with one or more of the first through ninth aspects, process 600 includes transmitting, to a network node, information identifying the activated group of candidate cells.

In an eleventh additional aspect, alone or in combination with one or more of the first through tenth aspects, the information identifying the activated group of candidate cells further comprises measurement information relating to one or more cells of the activated group of candidate cells.

In a twelfth additional aspect, alone or in combination with one or more of the first through eleventh aspects, measuring the activated group of candidate cells further comprises performing a measurement according to a configuration that corresponds to the activated group of candidate cells, and process 600 includes transmitting a measurement report associated with the measurement.

In a thirteenth additional aspect, alone or in combination with one or more of the first through twelfth aspects, process 600 includes receiving, prior to performing the measurement, dynamic signaling that indicates one or more cells of the activated group of candidate cells on which to perform the measurement.

In a fourteenth additional aspect, alone or in combination with one or more of the first through thirteenth aspects, process 600 includes transmitting, prior to identifying the activated group of candidate cells, a request for the one or more groups of candidate cells to be activated.

In a fifteenth additional aspect, alone or in combination with one or more of the first through fourteenth aspects, process 600 includes transmitting a random access message, on the cell, on a random access channel resource that is specific to a type or characteristic of the UE.

In a sixteenth additional aspect, alone or in combination with one or more of the first through fifteenth aspects, the random access channel resource is further specific to a condition at the UE, wherein the condition relates to at least one of an altitude of the UE, a range of altitudes of the UE, flighting path information of the UE, an area boundary, or a 3D geographical boundary.

In a seventeenth additional aspect, alone or in combination with one or more of the first through sixteenth aspects, process 600 includes transmitting a random access message, on a cell, on a random access channel resource that is specific to indicating the cell or the activated group of candidate cells.

Although FIG. 6 shows example blocks of process 600, in some aspects, process 600 may include additional blocks, fewer blocks, different blocks, or differently arranged blocks than those depicted in FIG. 6. Additionally or alternatively, two or more of the blocks of process 600 may be performed in parallel.

Figure 7:
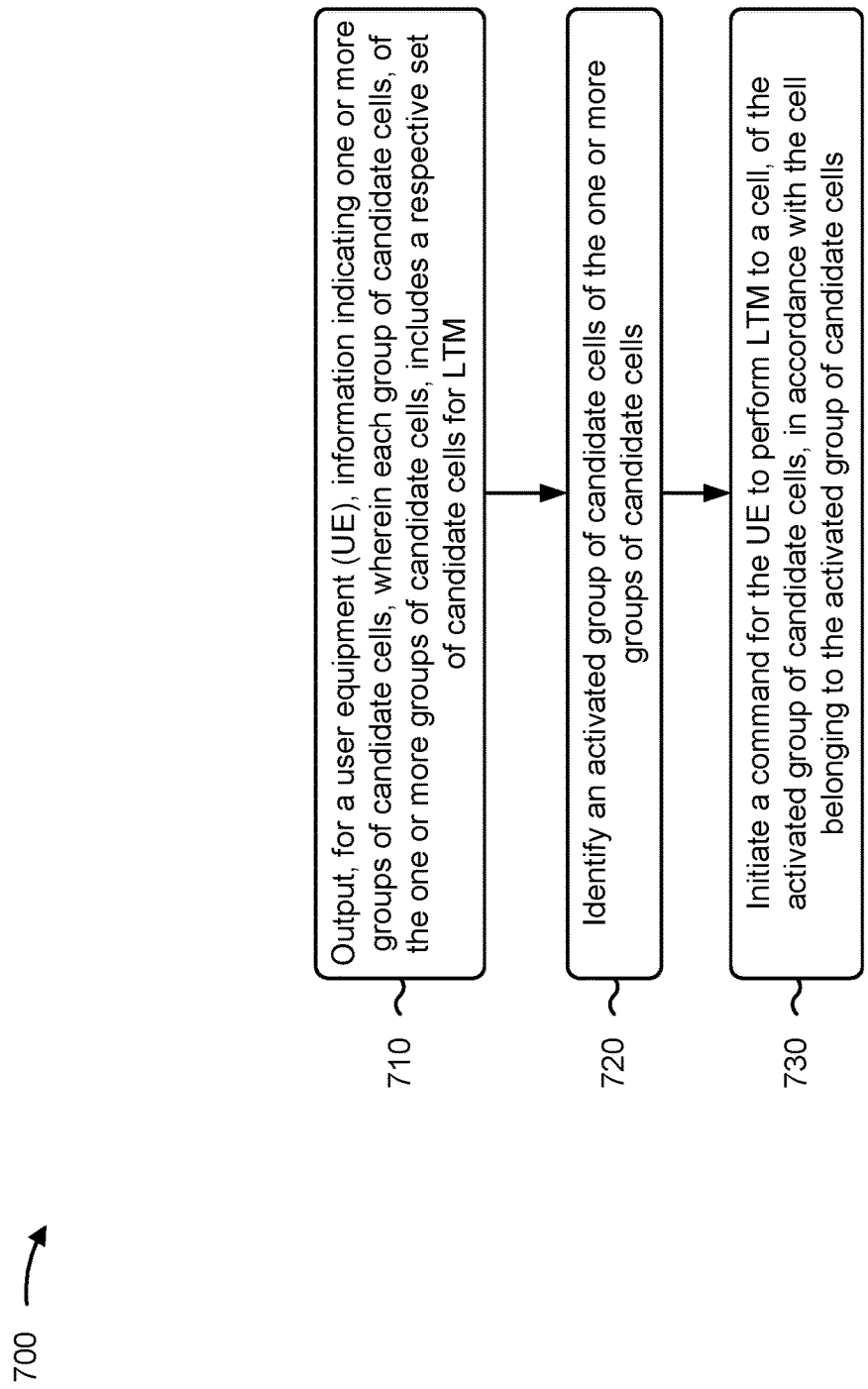
FIG. 7 is a flowchart illustrating an example process performed, for example, by a network node that supports LTM using activated groups of candidate cells.

FIG. 7 is a flowchart illustrating an example process 700 performed, for example, by a network node that supports LTM using activated groups of candidate cells. Example process 700 is an example where the network node (for example, network node 110) performs operations associated with LTM using activated groups of candidate cells.

As shown in FIG. 7, in some aspects, process 700 may include outputting, for a UE, information indicating one or more groups of candidate cells, wherein each group of candidate cells, of the one or more groups of candidate cells, includes a respective set of candidate cells for LTM (block 710). For example, the network node (such as by using communication manager 150 or transmission component 904, depicted in FIG. 9) may output, for a UE (for example, using signaling directed to the UE, such as on an RRC connection with the UE via a serving cell of the UE), information indicating one or more groups of candidate cells, wherein each group of candidate cells, of the one or more groups of candidate cells, includes a respective set of candidate cells for LTM, as described above.

As further shown in FIG. 7, in some aspects, process 700 may include identifying an activated group of candidate cells of the one or more groups of candidate cells (block 720). For example, the network node (such as by using communication manager 150 or identification component 908, depicted in FIG. 9) may identify an activated group of candidate cells of the one or more groups of candidate cells, as described above.

As further shown in FIG. 7, in some aspects, process 700 may include initiating a command for the UE to perform LTM to a cell, of the activated group of candidate cells, in accordance with the cell belonging to the activated group of candidate cells (block 730). For example, the network node (such as by using communication manager 150 or transmission component 904, depicted in FIG. 9) may initiate a command for the UE to perform LTM to a cell, of the activated group of candidate cells, in accordance with the cell belonging to the activated group of candidate cells, as described above.

Process 700 may include additional aspects, such as any single aspect or any combination of aspects described below or in connection with one or more other processes described elsewhere herein.

In a first additional aspect, only cells belonging to a currently activated group of candidate cells of the UE are available as target candidate cells for LTM.

In a second additional aspect, alone or in combination with the first aspect, the one or more groups of candidate cells include a plurality of groups of candidate cells.

In a third additional aspect, alone or in combination with one or more of the first and second aspects, the information indicates, for the activated group of candidate cells, a first set of candidate cells of the activated group of candidate cells, a first identifier of the first set of candidate cells, a second set of candidate cells of the activated group of candidate cells, and a second identifier of the second set of candidate cells.

In a fourth additional aspect, alone or in combination with one or more of the first through third aspects, identifying the activated group of candidate cells further comprises identifying the activated group of candidate cells based at least in part on at least one of outputting activation information indicating that the activated group of candidate cells is activated, or identifying the activated group of candidate cells in accordance with information received from the UE.

In a fifth additional aspect, alone or in combination with one or more of the first through fourth aspects, the activated group of candidate cells is one of a plurality of activated groups of candidate cells, wherein the activation information indicating that the activated group of candidate cells is activated indicates that the plurality of activated groups of candidate cells are activated.

In a sixth additional aspect, alone or in combination with one or more of the first through fifth aspects, the activation information indicates an identifier associated with a group of groups of candidate cells including the plurality of activate groups of candidate cells.

In a seventh additional aspect, alone or in combination with one or more of the first through sixth aspects, the information received from the UE includes at least one of an altitude of the UE, a location of the UE, flighting path information of the UE, a random access message, or information identifying the activated group of candidate cells.

In an eighth additional aspect, alone or in combination with one or more of the first through seventh aspects, the information identifying the activated group of candidate cells further comprises measurement information relating to one or more cells of the activated group of candidate cells.

In a ninth additional aspect, alone or in combination with one or more of the first through eighth aspects, initiating the command further comprises transmitting an indication to perform LTM to the cell of the activated group of candidate cells.

In a tenth additional aspect, alone or in combination with one or more of the first through ninth aspects, the activated group of candidate cells is associated with spectrum dedicated for aerial UEs, wherein the UE is an aerial UE.

In an eleventh additional aspect, alone or in combination with one or more of the first through tenth aspects, process 700 includes receiving a measurement report associated with a measurement in accordance with a configuration corresponding to the cell or the activated group of candidate cells.

In a twelfth additional aspect, alone or in combination with one or more of the first through eleventh aspects, process 700 includes transmitting dynamic signaling that indicates one or more cells of the activated group of candidate cells on which to perform the measurement.

In a thirteenth additional aspect, alone or in combination with one or more of the first through twelfth aspects, process 700 includes receiving, prior to identifying the activated group of candidate cells, a request for the one or more groups of candidate cells to be activated, and activating the activated group of candidate cells in accordance with the request.

In a fourteenth additional aspect, alone or in combination with one or more of the first through thirteenth aspects, process 700 includes receiving a random access message, on the cell, on a random access channel resource that is specific to aerial UEs.

In a fifteenth additional aspect, alone or in combination with one or more of the first through fourteenth aspects, the random access channel resource is further specific to a condition at the UE, wherein the condition relates to at least one of an altitude of the UE, a range of altitudes of the UE, flighting path information of the UE, an area boundary, or a three-dimensional geographical boundary.

In a sixteenth additional aspect, alone or in combination with one or more of the first through fifteenth aspects, process 700 includes receiving a random access message, on a cell, on a random access channel resource that is specific to indicating the cell or the activated group of candidate cells.

Although FIG. 7 shows example blocks of process 700, in some aspects, process 700 may include additional blocks, fewer blocks, different blocks, or differently arranged blocks than those depicted in FIG. 7. Additionally or alternatively, two or more of the blocks of process 700 may be performed in parallel.

Figure 8:
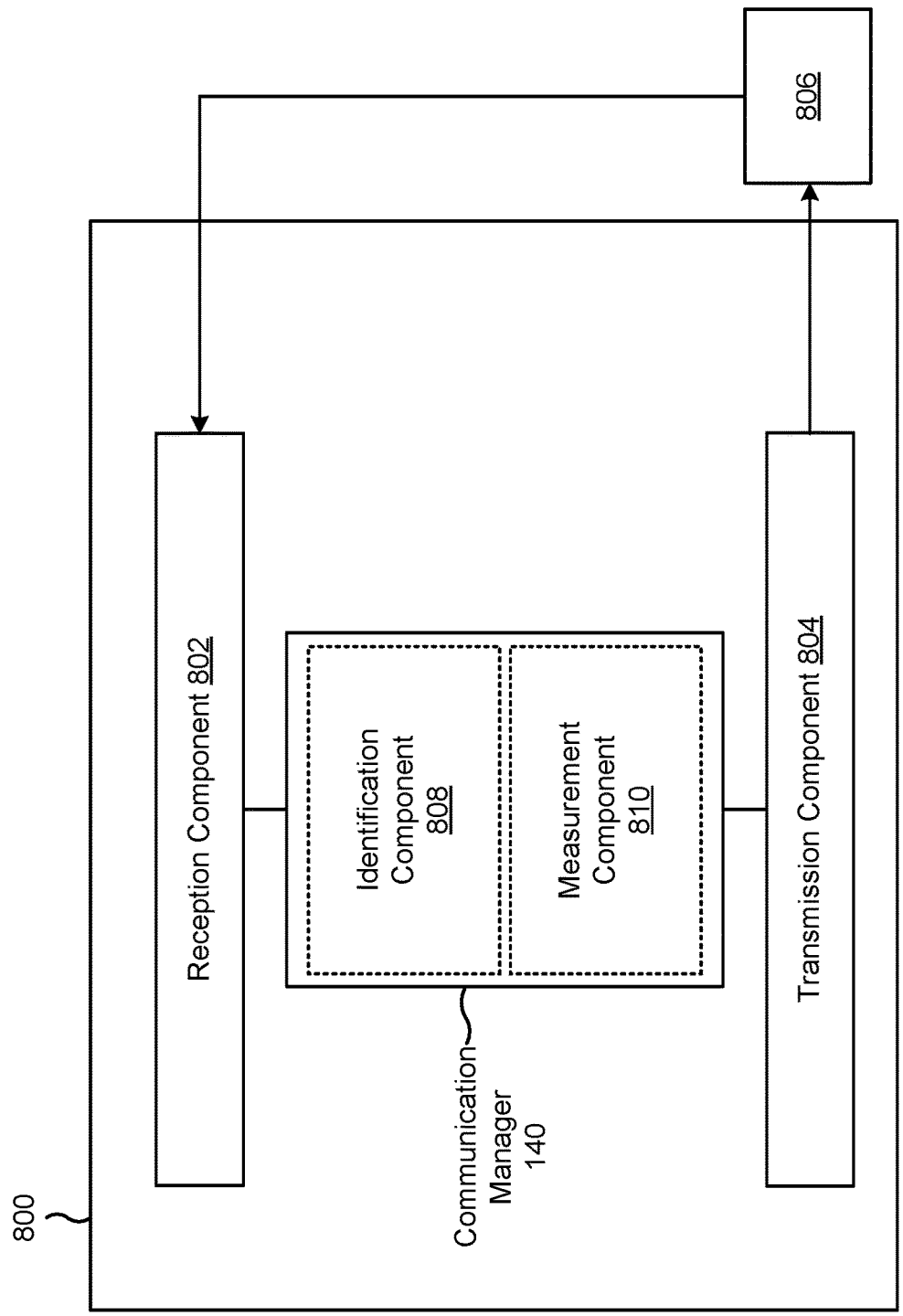
FIG. 8 is a diagram of an example apparatus for wireless communication that supports LTM using activated groups of candidate cells.

FIG. 8 is a diagram of an example apparatus 800 for wireless communication that supports LTM using activated groups of candidate cells. The apparatus 800 may be a UE, or a UE may include the apparatus 800. In some aspects, the apparatus 800 includes a reception component 802, a transmission component 804, and a communication manager 140, which may be in communication with one another (for example, via one or more buses). As shown, the apparatus 800 may communicate with another apparatus 806 (such as a UE, a network node, or another wireless communication device) using the reception component 802 and the transmission component 804.

In some aspects, the apparatus 800 may be configured to and/or operable to perform one or more operations described herein in connection with FIGS. 3-5. Additionally or alternatively, the apparatus 800 may be configured to and/or operable to perform one or more processes described herein, such as process 600 of FIG. 6. In some aspects, the apparatus 800 may include one or more components of the UE described above in connection with FIG. 2.

The reception component 802 may receive communications, such as reference signals, control information, and/or data communications, from the apparatus 806. The reception component 802 may provide received communications to one or more other components of the apparatus 800, such as the communication manager 140. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 802 may include one or more antennas, a modem, a demodulator, a MIMO detector, a receive processor, a controller/processor, and/or a memory of the UE described above in connection with FIG. 2.

The transmission component 804 may transmit communications, such as reference signals, control information, and/or data communications, to the apparatus 806. In some aspects, the communication manager 140 may generate communications and may transmit the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, and/or a memory of the UE described above in connection with FIG. 2. In some aspects, the transmission component 804 may be co-located with the reception component 802 in a transceiver.

The communication manager 140 may receive or may cause the reception component 802 to receive information indicating one or more groups of candidate cells, wherein each group of candidate cells, of the one or more groups of candidate cells, includes a respective set of candidate cells for LTM. The communication manager 140 may identify an activated group of candidate cells of the one or more groups of candidate cells. The communication manager 140 may measure the activated group of candidate cells in accordance with the activated group of candidate cells being activated. In some aspects, the communication manager 140 may perform one or more operations described elsewhere herein as being performed by one or more components of the communication manager 140.

The communication manager 140 may include a controller/processor, a memory, of the UE described above in connection with FIG. 2. In some aspects, the communication manager 140 includes a set of components, such as an identification component 808, and/or a measurement component 810. Alternatively, the set of components may be separate and distinct from the communication manager 140. In some aspects, one or more components of the set of components may include or may be implemented within a controller/processor or a memory, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive information indicating one or more groups of candidate cells, wherein each group of candidate cells, of the one or more groups of candidate cells, includes a respective set of candidate cells for LTM. The identification component 808 may identify an activated group of candidate cells of the one or more groups of candidate cells. The measurement component 810 may measure the activated group of candidate cells in accordance with the activated group of candidate cells being activated.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

Figure 9:
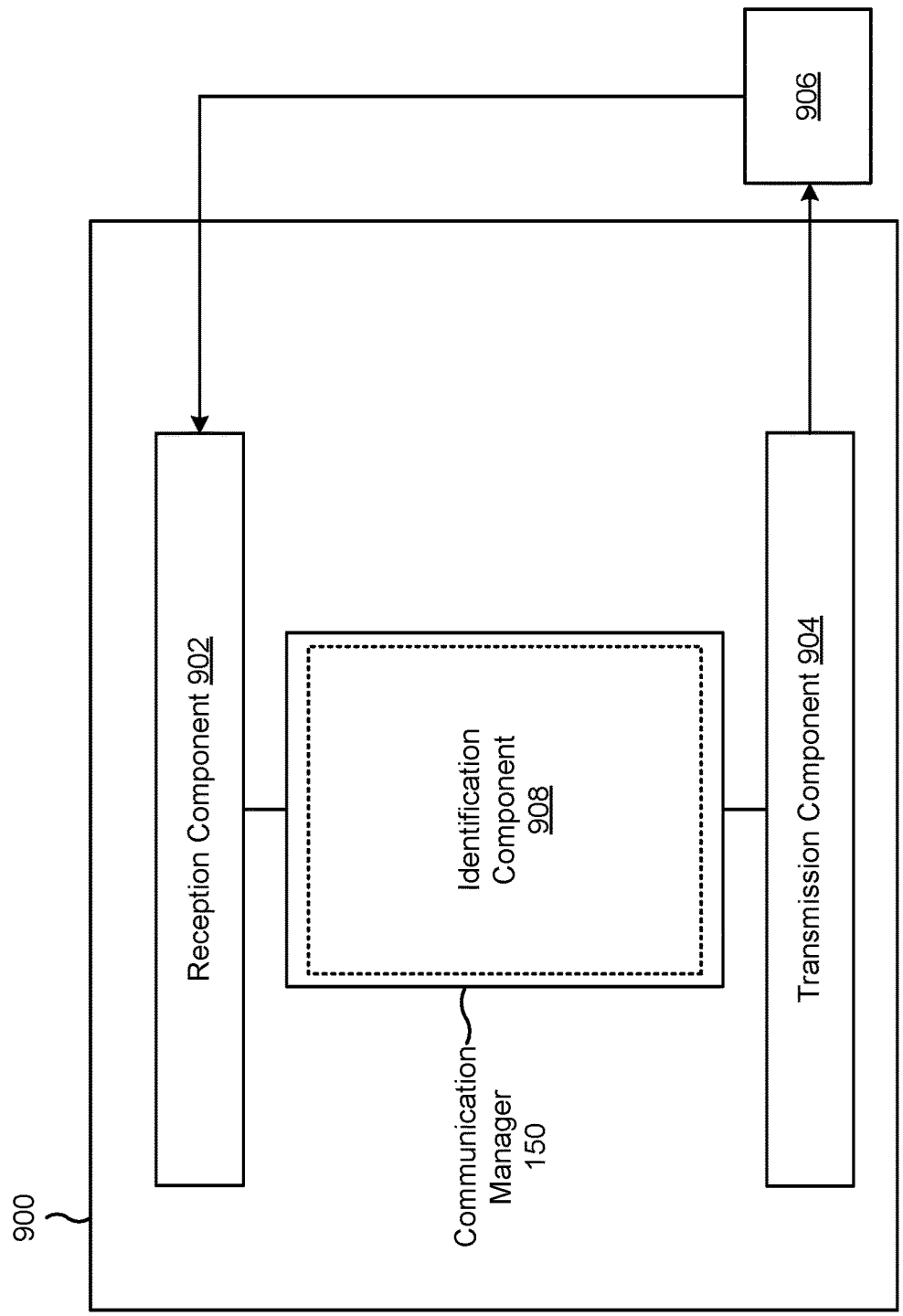
FIG. 9 is a diagram of an example apparatus for wireless communication that supports LTM using activated groups of candidate cells.

FIG. 9 is a diagram of an example apparatus 900 for wireless communication that supports LTM using activated groups of candidate cells. The apparatus 900 may be a network node, or a network node may include the apparatus 900. In some aspects, the apparatus 900 includes a reception component 902, a transmission component 904, and a communication manager 150, which may be in communication with one another (for example, via one or more buses). As shown, the apparatus 900 may communicate with another apparatus 906 (such as a UE, a network node, or another wireless communication device) using the reception component 902 and the transmission component 904.

In some aspects, the apparatus 900 may be configured to and/or operable to perform one or more operations described herein in connection with FIGS. 3-5. Additionally or alternatively, the apparatus 900 may be configured to and/or operable to perform one or more processes described herein, such as process 700 of FIG. 7. In some aspects, the apparatus 900 may include one or more components of the network node described above in connection with FIG. 2.

The reception component 902 may receive communications, such as reference signals, control information, and/or data communications, from the apparatus 906. The reception component 902 may provide received communications to one or more other components of the apparatus 900, such as the communication manager 150. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 902 may include one or more antennas, a modem, a demodulator, a MIMO detector, a receive processor, a controller/processor, and/or a memory of the network node described above in connection with FIG. 2.

The transmission component 904 may transmit communications, such as reference signals, control information, and/or data communications, to the apparatus 906. In some aspects, the communication manager 150 may generate communications and may transmit the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, and/or a memory of the network node described above in connection with FIG. 2. In some aspects, the transmission component 904 may be co-located with the reception component 902 in a transceiver.

The communication manager 150 may output, for a UE, information indicating one or more groups of candidate cells, wherein each group of candidate cells, of the one or more groups of candidate cells, includes a respective set of candidate cells for LTM. The communication manager 150 may identify an activated group of candidate cells of the one or more groups of candidate cells. The communication manager 150 may initiate a command for the UE to perform LTM to a cell, of the activated group of candidate cells, in accordance with the cell belonging to the activated group of candidate cells. In some aspects, the communication manager 150 may perform one or more operations described elsewhere herein as being performed by one or more components of the communication manager 150.

The communication manager 150 may include a controller/processor, a memory, a scheduler, and/or a communication unit of the network node described above in connection with FIG. 2. In some aspects, the communication manager 150 includes a set of components, such as an identification component 908. Alternatively, the set of components may be separate and distinct from the communication manager 150. In some aspects, one or more components of the set of components may include or may be implemented within a controller/processor, a memory, a scheduler, and/or a communication unit of the network node described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The transmission component 904 may output, for a UE, information indicating one or more groups of candidate cells, wherein each group of candidate cells, of the one or more groups of candidate cells, includes a respective set of candidate cells for LTM. The identification component 908 may identify an activated group of candidate cells of the one or more groups of candidate cells. The transmission component 904 may initiate a command for the UE to perform LTM to a cell, of the activated group of candidate cells, in accordance with the cell belonging to the activated group of candidate cells.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

The following provides an overview of some aspects of the present disclosure:

Aspect 1: A method of wireless communication performed by a user equipment (UE), comprising: receiving information indicating one or more groups of candidate cells, wherein each group of candidate cells, of the one or more groups of candidate cells, includes a respective set of candidate cells for Layer 1 or Layer 2 (L1/L2) triggered mobility (LTM); identifying an activated group of candidate cells of the one or more groups of candidate cells; and measuring the activated group of candidate cells in accordance with the activated group of candidate cells being activated.

Aspect 2: The method of Aspect 1, wherein only cells belonging to a currently activated group of candidate cells of the UE are available as target candidate cells for LTM.

Aspect 3: The method of any of Aspects 1-2, further comprising: autonomously switching to a cell, of the activated group of candidate cells, in accordance with the cell belonging to the activated group of candidate cells.

Aspect 4: The method of any of Aspects 1-3, wherein the information indicates, for the activated group of candidate cells, a first set of candidate cells of the activated group of candidate cells, a first identifier of the first set of candidate cells, a second set of candidate cells of the activated group of candidate cells, and a second identifier of the second set of candidate cells.

Aspect 5: The method of any of Aspects 1-4, wherein identifying the activated group of candidate cells further comprises identifying the activated group of candidate cells based at least in part on at least one of: receiving activation information indicating that the activated group of candidate cells is activated, or identifying the activated group of candidate cells in accordance with a condition at the UE.

Aspect 6: The method of Aspect 5, wherein the activated group of candidate cells is one of a plurality of activated groups of candidate cells, wherein the activation information indicating that the activated group of candidate cells is activated indicates that the plurality of activated groups of candidate cells are activated.

Aspect 7: The method of Aspect 6, wherein the activation information indicates an identifier associated with a group of groups of candidate cells including the plurality of activated groups of candidate cells.

Aspect 8: The method of Aspect 5, wherein the condition relates to at least one of: an altitude of the UE, a range of altitudes of the UE, flight path information of the UE, an area boundary, or a three-dimensional geographical boundary.

Aspect 9: The method of any of Aspects 1-8, further comprising receiving an indication to switch to the cell of the activated group of candidate cells, wherein switching to the cell of the activated group of candidate cells is in accordance with the indication.

Aspect 10: The method of any of Aspects 1-9, wherein the activated group of candidate cells is associated with spectrum dedicated for aerial UEs.

Aspect 11: The method of any of Aspects 1-10, further comprising transmitting, to a network node, information identifying the activated group of candidate cells.

Aspect 12: The method of Aspect 11, wherein the information identifying the activated group of candidate cells further comprises measurement information relating to one or more cells of the activated group of candidate cells.

Aspect 13: The method of any of Aspects 1-12, wherein measuring the activated group of candidate cells further comprises performing a measurement according to a configuration that corresponds to the activated group of candidate cells; and wherein the method further comprises transmitting a measurement report associated with the measurement.

Aspect 14: The method of Aspect 13, further comprising receiving, prior to performing the measurement, dynamic signaling that indicates one or more cells of the activated group of candidate cells on which to perform the measurement.

Aspect 15: The method of any of Aspects 1-14, further comprising transmitting, prior to identifying the activated group of candidate cells, a request for the one or more groups of candidate cells to be activated.

Aspect 16: The method of any of Aspects 1-15, further comprising transmitting a random access message, on the cell, on a random access channel resource that is specific to a type or characteristic of the UE.

Aspect 17: The method of Aspect 16, wherein the random access channel resource is further specific to a condition at the UE, wherein the condition relates to at least one of: an altitude of the UE, a range of altitudes of the UE, flight path information of the UE, an area boundary, or a 3D geographical boundary.

Aspect 18: The method of any of Aspects 1-17, further comprising transmitting a random access message, on a cell, on a random access channel resource that is specific to indicating the cell or the activated group of candidate cells.

Aspect 19: A method of wireless communication performed by a network node, comprising: outputting, for a user equipment (UE), information indicating one or more groups of candidate cells, wherein each group of candidate cells, of the one or more groups of candidate cells, includes a respective set of candidate cells for Layer 1 or Layer 2 (L1/L2) triggered mobility (LTM); identifying an activated group of candidate cells of the one or more groups of candidate cells; and initiating a command for the UE to perform LTM to a cell, of the activated group of candidate cells, in accordance with the cell belonging to the activated group of candidate cells.

Aspect 20: The method of Aspect 19, wherein only cells belonging to a currently activated group of candidate cells of the UE are available as target candidate cells for LTM.

Aspect 21: The method of any of Aspects 19-20, wherein the one or more groups of candidate cells include a plurality of groups of candidate cells.

Aspect 22: The method of any of Aspects 19-21, wherein the information indicates, for the activated group of candidate cells, a first set of candidate cells of the activated group of candidate cells, a first identifier of the first set of candidate cells, a second set of candidate cells of the activated group of candidate cells, and a second identifier of the second set of candidate cells.

Aspect 23: The method of any of Aspects 19-22, wherein identifying the activated group of candidate cells further comprises identifying the activated group of candidate cells based at least in part on at least one of: outputting activation information indicating that the activated group of candidate cells is activated, or identifying the activated group of candidate cells in accordance with information received from the UE.

Aspect 24: The method of Aspect 23, wherein the activated group of candidate cells is one of a plurality of activated groups of candidate cells, wherein the activation information indicating that the activated group of candidate cells is activated indicates that the plurality of activated groups of candidate cells are activated.

Aspect 25: The method of Aspect 24, wherein the activation information indicates an identifier associated with a group of groups of candidate cells including the plurality of activate groups of candidate cells.

Aspect 26: The method of Aspect 23, wherein the information received from the UE includes at least one of: an altitude of the UE, a location of the UE, flight path information of the UE, a random access message, or information identifying the activated group of candidate cells.

Aspect 27: The method of Aspect 26, wherein the information identifying the activated group of candidate cells further comprises measurement information relating to one or more cells of the activated group of candidate cells.

Aspect 28: The method of any of Aspects 19-27, wherein initiating the command further comprises transmitting an indication to perform LTM to the cell of the activated group of candidate cells.

Aspect 29: The method of any of Aspects 19-28, wherein the activated group of candidate cells is associated with spectrum dedicated for aerial UEs, wherein the UE is an aerial UE.

Aspect 30: The method of any of Aspects 19-29, further comprising receiving a measurement report associated with a measurement in accordance with a configuration corresponding to the cell or the activated group of candidate cells.

Aspect 31: The method of Aspect 30, further comprising transmitting dynamic signaling that indicates one or more cells of the activated group of candidate cells on which to perform the measurement.

Aspect 32: The method of any of Aspects 19-31, further comprising receiving, prior to identifying the activated group of candidate cells, a request for the one or more groups of candidate cells to be activated; and activating the activated group of candidate cells in accordance with the request.

Aspect 33: The method of any of Aspects 19-32, further comprising receiving a random access message, on the cell, on a random access channel resource that is specific to aerial UEs.

Aspect 34: The method of Aspect 33, wherein the random access channel resource is further specific to a condition at the UE, wherein the condition relates to at least one of: an altitude of the UE, a range of altitudes of the UE, flight path information of the UE, an area boundary, or a three-dimensional geographical boundary.

Aspect 35: The method of any of Aspects 19-34, further comprising receiving a random access message, on a cell, on a random access channel resource that is specific to indicating the cell or the activated group of candidate cells.

Aspect 36: The method of any of Aspects 1-35, wherein the group of candidate cells is one of a plurality of groups of candidate cells.

Aspect 37: An apparatus for wireless communication at a device, comprising a processor; memory coupled with the processor; and instructions stored in the memory and executable by the processor to cause the apparatus to perform the method of one or more of Aspects 1-36.

Aspect 38: A device for wireless communication, comprising a memory and one or more processors coupled to the memory, the one or more processors configured to perform the method of one or more of Aspects 1-36.

Aspect 39: An apparatus for wireless communication, comprising at least one means for performing the method of one or more of Aspects 1-36.

Aspect 40: A non-transitory computer-readable medium storing code for wireless communication, the code comprising instructions executable by a processor to perform the method of one or more of Aspects 1-36.

Aspect 41: A non-transitory computer-readable medium storing a set of instructions for wireless communication, the set of instructions comprising one or more instructions that, when executed by one or more processors of a device, cause the device to perform the method of one or more of Aspects 1-36.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

As used herein, the term "determine" or "determining" encompasses a wide variety of actions and, therefore, "determining" can include calculating, computing, processing, deriving, investigating, looking up (such as via looking up in a table, a database or another data structure), identifying, inferring, ascertaining, measuring, and the like. Also, "determining" can include receiving (such as receiving information or receiving an indication), accessing (such as accessing data stored in memory), transmitting (such as transmitting information) and the like. Also, "determining" can include resolving, selecting, obtaining, choosing, establishing and other such similar actions. The term "identify" or "identifying" also encompasses a wide variety of actions and, therefore, "identifying" can include calculating, computing, processing, deriving, investigating, looking up (such as via looking up in a table, a database or another data structure), inferring, ascertaining, measuring, and the like. Also, "identifying" can include receiving (such as receiving information or receiving an indication), accessing (such as accessing data stored in memory), transmitting (such as transmitting information) and the like. Also, "identifying" can include resolving, selecting, obtaining, choosing, establishing and other such similar actions. A device being configured to perform a function means that the device is capable of performing the function, and does not require that the device actually perform the function.

Reference to "a/the processor," "a/the controller/processor," or the like (in the singular) should be understood to refer to any one or more of the processors described in connection with FIG. 2 (such as a single processor or a combination of multiple different processors, which may, for example, perform different functions described as being performed by the processor or the controller/processor). Reference to "one or more processors" should be understood to refer to any one or more of the processors described in connection with FIG. 2. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or different sets of processors. Similarly, reference to "a/the memory" should be understood to refer to any one or more memories of the corresponding device or node (for example, a single memory or a combination of multiple different memories). Reference to "one or more memories" should be understood to refer to any one or more memories of a corresponding device, such as the memory described in connection with FIG. 2. For example, a first memory of the one or more memories may perform a first function described as being performed by the one or more memories, and a second memory of the one or more memories may perform a second function described as being performed by the one or more memories."

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, as used herein, "based on" is intended to be interpreted in the inclusive sense, unless otherwise explicitly indicated. For example, "based on" may be used interchangeably with "based at least in part on," "associated with", or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions or information. . . . Also, as used herein, the term "or" is intended to be inclusive when used in a series and may be used interchangeably with "and/or," unless explicitly stated otherwise (for example, if used in combination with "either" or "only one of").

What is claimed is:

1. A user equipment (UE) for wireless communication, comprising:
   one or more memories; and
   one or more processors, coupled to the one or more memories, configured to:
      receive information indicating one or more groups of candidate cells, wherein each group of candidate cells, of the one or more groups of candidate cells, includes a respective set of candidate cells for Layer 1 or Layer 2 (L1/L2) triggered mobility (LTM);
      identify an activated group of candidate cells of the one or more groups of candidate cells; and
      measure the activated group of candidate cells in accordance with the activated group of candidate cells being activated.

2. The UE of claim 1, wherein only cells belonging to a currently activated group of candidate cells of the UE are available as target candidate cells for LTM.

3. The UE of claim 1, wherein the one or more processors are further configured to:
   autonomously switch to a cell, of the activated group of candidate cells, in accordance with the cell belonging to the activated group of candidate cells.

4. The UE of claim 1, wherein the information indicates, for the activated group of candidate cells, a first set of candidate cells of the activated group of candidate cells, a first identifier of the first set of candidate cells, a second set of candidate cells of the activated group of candidate cells, and a second identifier of the second set of candidate cells.

5. The UE of claim 1, wherein the one or more processors, to identify the activated group of candidate cells, are configured to identify the activated group of candidate cells based at least in part on at least one of:
   activation information indicating that the activated group of candidate cells is activated, or
   a condition at the UE.

6. The UE of claim 5, wherein the activated group of candidate cells is one of a plurality of activated groups of candidate cells, wherein the activation information indicating that the activated group of candidate cells is activated indicates that the plurality of activated groups of candidate cells are activated.

7. The UE of claim 6, wherein the activation information indicates an identifier associated with a group of groups of candidate cells including the plurality of activated groups of candidate cells.

8. The UE of claim 5, wherein the condition relates to at least one of:
   an altitude of the UE,
   a range of altitudes of the UE,
   flight path information of the UE,
   an area boundary, or
   a three-dimensional geographical boundary.

9. The UE of claim 1, wherein the activated group of candidate cells is associated with spectrum dedicated for aerial UEs.

10. The UE of claim 1, wherein the one or more processors, to measure the activated group of candidate cells, are configured to perform a measurement according to a configuration that corresponds to the activated group of candidate cells; and
   wherein the one or more processors are configured to transmit a measurement report associated with the measurement.

11. The UE of claim 10, wherein the one or more processors are further configured to receive, prior to performing the measurement, dynamic signaling that indicates one or more cells of the activated group of candidate cells on which to perform the measurement.

12. The UE of claim 1, wherein the one or more processors are further configured to transmit a random access message, on a cell, on a random access channel resource that is specific to a type or characteristic of the UE.

13. The UE of claim 12, wherein the random access channel resource is further specific to a condition at the UE, wherein the condition relates to at least one of:
   an altitude of the UE,
   a range of altitudes of the UE,
   flight path information of the UE,
   an area boundary, or
   a 3D geographical boundary.

14. The UE of claim 1, wherein the one or more processors are further configured to transmit a random access message, on a cell, on a random access channel resource that is specific to indicating the cell or the activated group of candidate cells.

15. A network node for wireless communication, comprising:
   one or more memories; and
   one or more processors, coupled to the one or more memories, configured to:
      output, for a user equipment (UE), information indicating one or more groups of candidate cells, wherein each group of candidate cells, of the one or more groups of candidate cells, includes a respective set of candidate cells for Layer 1 or Layer 2 (L1/L2) triggered mobility (LTM);
      identify an activated group of candidate cells of the one or more groups of candidate cells; and
      initiate a command for the UE to perform LTM to a cell, of the activated group of candidate cells, in accordance with the cell belonging to the activated group of candidate cells.

16. The network node of claim 15, wherein the one or more groups of candidate cells include a plurality of groups of candidate cells.

17. The network node of claim 15, wherein the information indicates, for the activated group of candidate cells, a first set of candidate cells of the activated group of candidate cells, a first identifier of the first set of candidate cells, a second set of candidate cells of the activated group of candidate cells, and a second identifier of the second set of candidate cells.

18. The network node of claim 15, wherein the one or more processors, to initiate the command, are configured to transmit an indication to perform LTM to the cell of the activated group of candidate cells.

19. The network node of claim 15, wherein the one or more processors are further configured to receive a measurement report associated with a measurement in accordance with a configuration corresponding to the cell or the activated group of candidate cells.

20. The network node of claim 19, wherein the one or more processors are further configured to transmit dynamic signaling that indicates one or more cells of the activated group of candidate cells on which to perform the measurement.

21. The network node of claim 15, wherein the one or more processors are further configured to receive, prior to identifying the activated group of candidate cells, a request for the one or more groups of candidate cells to be activated; and
   activate the activated group of candidate cells in accordance with the request.

22. A method of wireless communication performed by a user equipment (UE), comprising:
   receiving information indicating one or more groups of candidate cells, wherein each group of candidate cells, of the one or more groups of candidate cells, includes a respective set of candidate cells for Layer 1 or Layer 2 (L1/L2) triggered mobility (LTM);
   identifying an activated group of candidate cells of the one or more groups of candidate cells; and
   measuring the activated group of candidate cells in accordance with the activated group of candidate cells being activated.

23. The method of claim 22, further comprising:
   autonomously switching to a cell, of the activated group of candidate cells, in accordance with the cell belonging to the activated group of candidate cells.

24. The method of claim 22, further comprising receiving an indication to switch to a cell of the activated group of candidate cells; and
   switching to the cell of the activated group of candidate cells is in accordance with the indication.

25. The method of claim 22, further comprising transmitting, to a network node, information identifying the activated group of candidate cells.

26. The method of claim 25, wherein the information identifying the activated group of candidate cells further comprises measurement information relating to one or more cells of the activated group of candidate cells.

27. A method of wireless communication performed by a network node, comprising:
   outputting, for a user equipment (UE), information indicating one or more groups of candidate cells, wherein each group of candidate cells, of the one or more groups of candidate cells, includes a respective set of candidate cells for Layer 1 or Layer 2 (L1/L2) triggered mobility (LTM);
   identifying an activated group of candidate cells of the one or more groups of candidate cells; and
   initiating a command for the UE to perform LTM to a cell, of the activated group of candidate cells, in accordance with the cell belonging to the activated group of candidate cells.

28. The method of claim 27, wherein identifying the activated group of candidate cells further comprises identifying the activated group of candidate cells based at least in part on at least one of:
- outputting activation information indicating that the activated group of candidate cells is activated, or
- identifying the activated group of candidate cells in accordance with information received from the UE.

29. The method of claim 28, wherein the activated group of candidate cells is one of a plurality of activated groups of candidate cells, wherein the activation information indicating that the activated group of candidate cells is activated indicates that the plurality of activated groups of candidate cells are activated.

30. The method of claim 29, wherein the activation information indicates an identifier associated with a group of groups of candidate cells including the plurality of activate groups of candidate cells.

* * * * *